United States Patent
Dupré et al.

(10) Patent No.: US 10,697,555 B2
(45) Date of Patent: Jun. 30, 2020

(54) VALVE

(71) Applicant: Signode Industrial Group LLC, Glenview, IL (US)

(72) Inventors: Dominique Dupré, Sance (FR); Peter Eggertsen, Støvring (DK); Johan Ceelen, Best (NL); Emin İpeklioğlu, Izmir (TR); Hasan Gür, Amasya (TR)

(73) Assignee: Signode Industrial Group LLC, Glenview, IL (US)

( * ) Notice: Subject to any disclaimer, the term of this patent is extended or adjusted under 35 U.S.C. 154(b) by 0 days.

(21) Appl. No.: 16/037,203

(22) Filed: Jul. 17, 2018

(65) Prior Publication Data

US 2019/0056038 A1     Feb. 21, 2019

Related U.S. Application Data

(60) Provisional application No. 62/546,710, filed on Aug. 17, 2017.

(51) Int. Cl.
| | |
|---|---|
| *F16K 15/20* | (2006.01) |
| *B65D 81/05* | (2006.01) |
| *F16K 15/06* | (2006.01) |
| *F16K 15/18* | (2006.01) |

(52) U.S. Cl.
CPC .......... *F16K 15/207* (2013.01); *B65D 81/052* (2013.01); *F16K 15/063* (2013.01); *F16K 15/18* (2013.01); *F16K 15/205* (2013.01)

(58) Field of Classification Search
CPC .... F16K 15/207; F16K 15/20; Y10T 137/207; B60C 29/00
See application file for complete search history.

(56) References Cited

U.S. PATENT DOCUMENTS

| | | |
|---|---|---|
| 241,930 A | 5/1881 | Clayton |
| 1,963,685 A | 6/1934 | Shimer |
| 2,613,054 A | 10/1952 | Maier |
| 2,657,704 A | 11/1953 | Fausek |
| 3,411,397 A | 11/1968 | Birmingham |
| 3,785,395 A | 1/1974 | Andreasson |
| 3,808,981 A | 5/1974 | Shaw |
| 4,015,622 A | 4/1977 | Pagani |
| 4,046,163 A | 9/1977 | Novak |
| 4,073,389 A | 2/1978 | Angarola et al. |

(Continued)

FOREIGN PATENT DOCUMENTS

| | | |
|---|---|---|
| CN | 105927768 A | 9/2016 |
| DE | 90 02 226 | 6/1990 |

(Continued)

OTHER PUBLICATIONS

European Patent Office, Extended European Search Report dated Dec. 19, 2018 in corresponding EP Application No. 18186575.9 (11 pages).

(Continued)

*Primary Examiner* — Mary E McManmon
*Assistant Examiner* — Kevin R Barss
(74) *Attorney, Agent, or Firm* — Neal, Gerber & Eisenberg LLP

(57) ABSTRACT

Various embodiments of the present disclosure provide a valve for an inflatable object. The valve is attached to the inflatable object and usable to control the flow of gas (such as air) into (or out of) the interior of the inflatable object to enable inflation (or deflation) of the inflatable object.

20 Claims, 17 Drawing Sheets

(56) References Cited

U.S. PATENT DOCUMENTS

| | | | |
|---|---|---|---|
| 4,146,070 A | 3/1979 | Angarola et al. |
| 4,257,575 A | 3/1981 | Runyan |
| 4,766,628 A | 8/1988 | Walker |
| 4,927,397 A | 5/1990 | Yeager |
| 5,082,244 A | 1/1992 | Krier et al. |
| 5,111,838 A | 5/1992 | Langston |
| 5,143,351 A | 9/1992 | Pierce |
| 5,255,640 A | 10/1993 | Pierce |
| 5,339,959 A | 8/1994 | Cornwell |
| 5,540,528 A | 7/1996 | Schmidt et al. |
| 5,806,572 A | 9/1998 | Voller |
| 5,839,488 A | 11/1998 | Peters |
| 5,881,783 A | 3/1999 | Chou |
| 5,908,275 A | 6/1999 | Howlett, Jr. et al. |
| 6,089,251 A | 7/2000 | Pestel |
| 6,138,711 A | 10/2000 | Lung-Po |
| 6,386,247 B1 | 5/2002 | Elze et al. |
| 6,432,495 B1 | 8/2002 | Berrier et al. |
| 6,823,905 B1 | 11/2004 | Smith et al. |
| D499,637 S | 12/2004 | Elze et al. |
| 6,929,021 B2 | 8/2005 | Cavenagh |
| 7,008,155 B2 | 3/2006 | Smith et al. |
| 7,011,480 B2 | 3/2006 | Ahlert et al. |
| 7,051,753 B1 | 5/2006 | Caires et al. |
| 7,401,619 B2 | 7/2008 | Song |
| 7,410,145 B1 | 8/2008 | Elze et al. |
| 7,434,594 B1 | 10/2008 | Robbins et al. |
| 7,438,081 B1 | 10/2008 | Chen |
| 7,497,416 B2 | 3/2009 | Wang |
| 7,610,929 B2 | 11/2009 | Zielinski et al. |
| 7,793,687 B2 | 9/2010 | Smith et al. |
| 7,909,554 B2 | 3/2011 | Keenan et al. |
| 8,235,632 B2 | 8/2012 | Keenan |
| 8,667,982 B2 | 3/2014 | Song et al. |
| 9,121,519 B2 | 9/2015 | Wang et al. |
| 9,505,334 B2 | 11/2016 | Maness et al. |
| 9,896,256 B2 | 2/2018 | Pansegrouw |
| 9,915,365 B2 | 3/2018 | Pansegrouw |
| 9,969,316 B2 | 5/2018 | Pansegrouw |
| 10,161,537 B2 | 12/2018 | Maness et al. |
| 2006/0266416 A1 | 11/2006 | Chen |
| 2009/0139582 A1 | 6/2009 | Franta et al. |
| 2010/0043914 A1 | 2/2010 | Pansegrouw |
| 2010/0154897 A1 | 6/2010 | Wu |
| 2012/0048392 A1 | 3/2012 | Song et al. |
| 2014/0238505 A1 | 8/2014 | Petersen |
| 2017/0267156 A1 | 9/2017 | Beard et al. |

FOREIGN PATENT DOCUMENTS

| | | |
|---|---|---|
| DE | 20 2006 000232 | 5/2006 |
| DE | 20 2007 000758 | 4/2007 |
| EP | 0849513 | 6/1998 |
| GB | 2 038 452 | 7/1980 |
| WO | WO 98/16767 | 4/1998 |
| WO | WO 2008/110981 | 9/2008 |

OTHER PUBLICATIONS

"Communication pursuant to Article 94(e) EPC (Examination Action)", From corresponding Application EP18186575.9-1015 (6 pages), dated Oct. 15, 2019.

"Communication Pursuant to Article 94(3) EPC", EP Application No. EP18186579.9 (7 pages), dated Apr. 3, 2020.

VALVE

PRIORITY CLAIM

This patent application claims priority to and the benefit of U.S. Provisional Patent Application No. 62/546,710, which was filed on Aug. 17, 2017, the entire contents of which are incorporated herein by reference.

BACKGROUND

Valves are used to inflate and, in some instances, deflate inflatable objects, such as dunnage bags. Dunnage bags are used to stabilize and limit movement of cargo during transportation of cargo containers. Generally, after some or all of the cargo is loaded into a cargo container, uninflated dunnage bags are positioned in the voids between the cargo. The dunnage bags are then inflated to a desired pressure using air from a compressed air source. The inflated dunnage bags fill the voids to limit lateral movement of the cargo during transit. If an inflated dunnage bag needs to be repositioned, the user opens its valve to enable air within the dunnage bag to escape, thereby partially deflating the dunnage bag. The user then repositions and re-inflates the dunnage bag.

There is a continuing need to make these valves simpler, easier and less expensive to manufacture and assemble, and more durable while also maintaining or increasing the rate at which gas can flow through the valve into (or out of) the inflatable object.

SUMMARY

Various embodiments of the present disclosure provide a valve for an inflatable object that is simpler, easier and less expensive to manufacture and assemble, and more durable than existing valves while also maintaining or increasing the rate at which gas can flow through the valve into (or out of) the inflatable object.

In various embodiments, a valve for an inflatable object comprises a housing defining a gas passageway and including a sealing lip; a stem assembly mounted to the housing and movable relative to the housing between a closed configuration and an open configuration, the stem assembly comprising a stem including a shaft and a base, a retaining element mounted to the base, and a sealing element mounted to the base and positioned between the retaining element and the base; and a biasing element biasing the stem assembly to the closed configuration. When the stem assembly is in the closed configuration, the sealing element sealingly engages the sealing lip so the gas passageway is closed. When the stem assembly is in the open configuration, the sealing element is spaced-apart from the sealing lip so the gas passageway is open.

In other embodiments, an inflatable object comprises an inflatable bladder defining an interior and a valve. The valve comprises a housing including a sealing lip and defining a gas passageway in fluid communication with the interior of the bladder; a stem assembly mounted to the housing and movable relative to the housing between a closed configuration and an open configuration, the stem assembly comprising a stem including a shaft and a base, a retaining element mounted to the base, and a sealing element mounted to the base and positioned between the retaining element and the base; and a biasing element biasing the stem assembly to the closed configuration. When the stem assembly is in the closed configuration, the sealing element sealingly engages the sealing lip so the gas passageway is closed to prevent gas from flowing into or out of the interior of the inflatable bladder through the gas passageway. When the stem assembly is in the open configuration, the sealing element is spaced-apart from the sealing lip so the gas passageway is open to enable gas to flow into or out of the interior of the inflatable bladder through the gas passageway.

DETAILED DESCRIPTION

Figure 1:
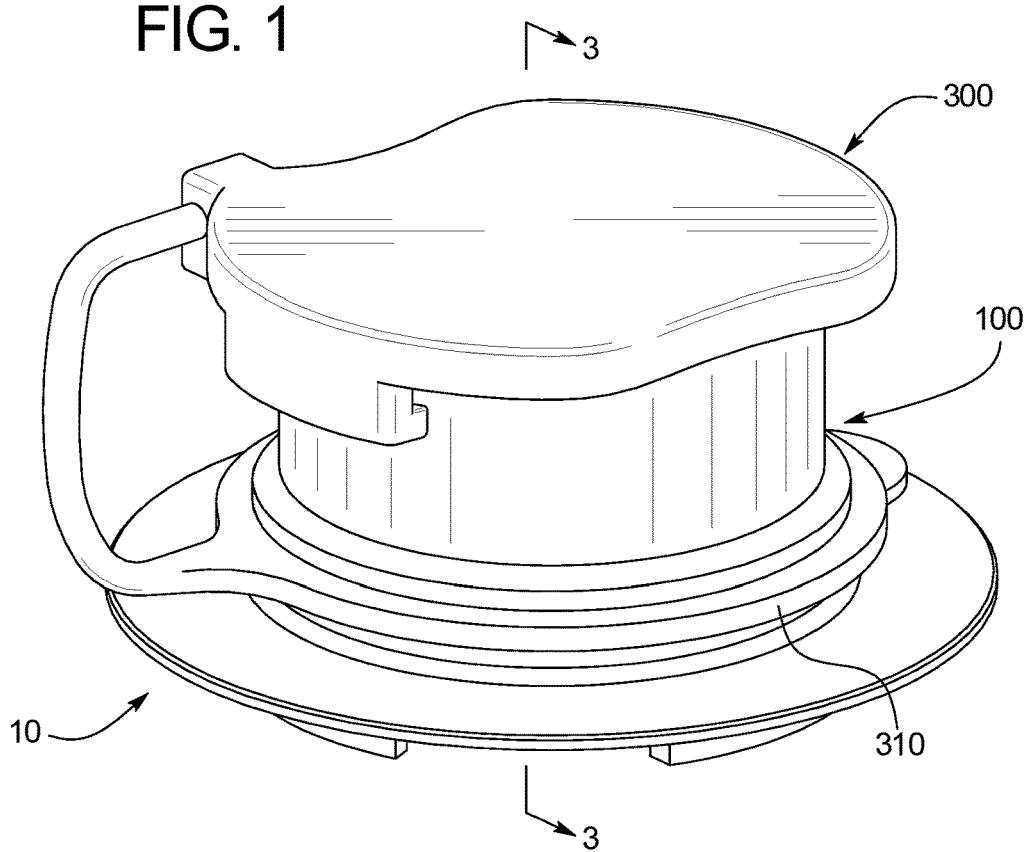
FIG. 1 is a top perspective view of one example embodiment of a valve of the present disclosure and shows a cap assembly of the valve attached to a housing of the valve. A sealing assembly of the valve is mounted to the housing, and a stem assembly of the sealing assembly is in a closed configuration relative to the housing.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, etc., are not intended to be limited to direct mounting methods but should be interpreted broadly to include indirect and operably coupled, mounted, connected and like mounting methods. This specification is intended to be taken as a whole and interpreted in accordance with the principles of the present disclosure and as understood by one of ordinary skill in the art.

Figure 2:
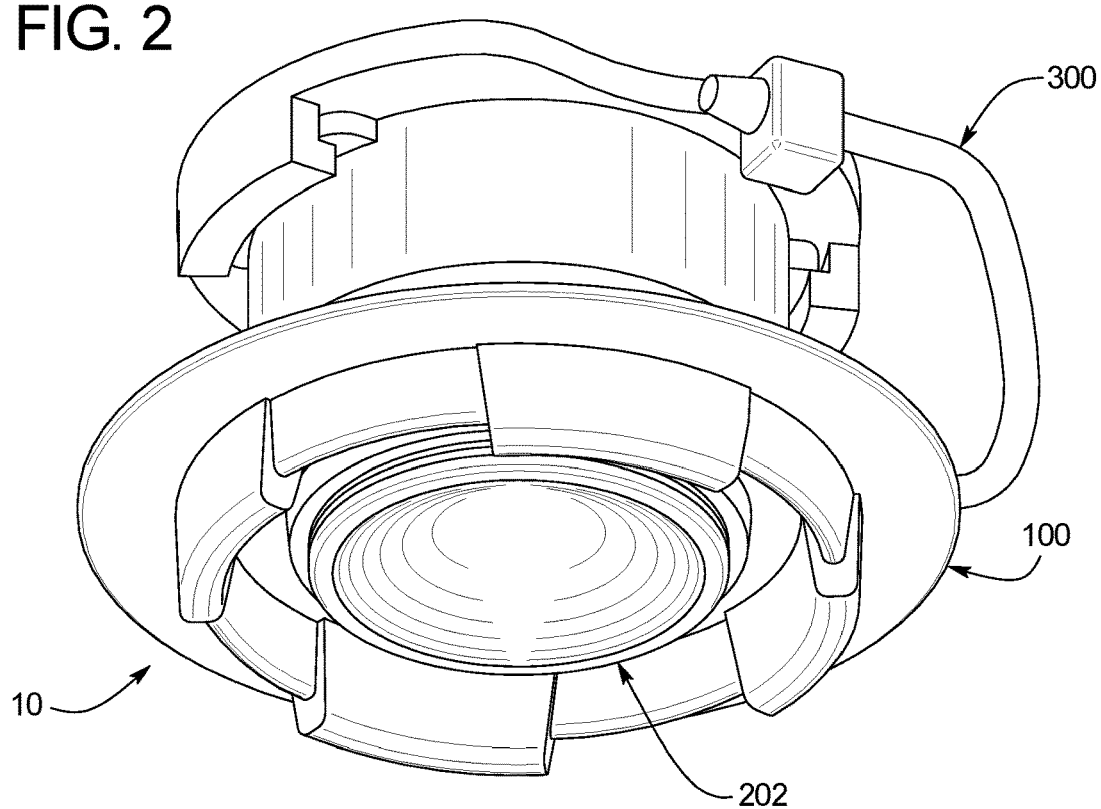
FIG. 2 is a bottom perspective view of the valve of FIG. 1.
Figure 3:
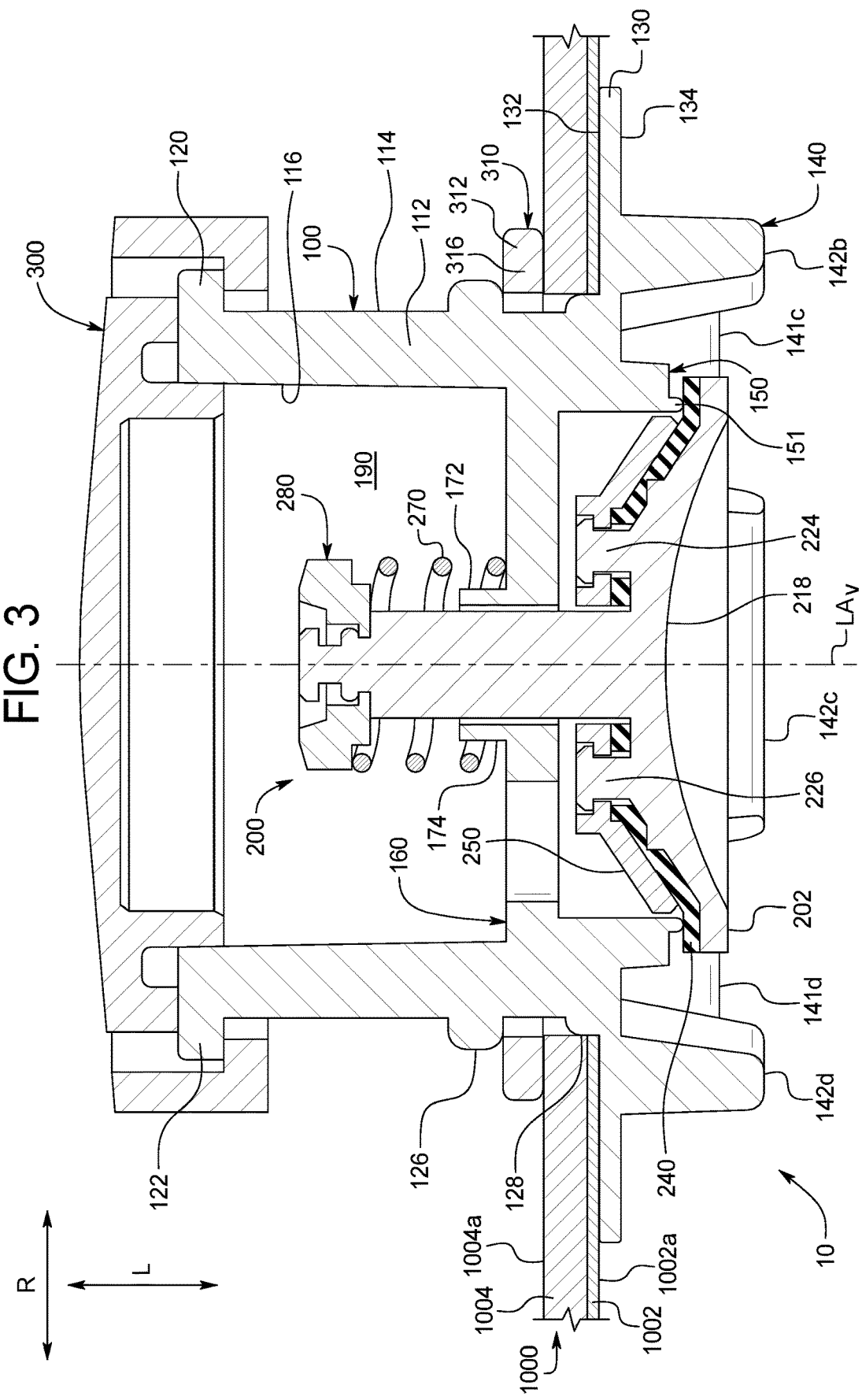
FIG. 3 is a cross-sectional view of the valve of FIG. 1 taken substantially along line 3-3 of FIG. 1. The valve is attached to a dunnage bag shown infragmentary.

FIGS. 1-28 illustrate one example embodiment of a valve 10 of the present disclosure and its components. As shown in FIG. 3, the valve 10 is attached to a dunnage bag 1000 formed from an inflatable, airtight inner bladder 1002 and an outer bag 1004 that encloses the inner bladder 1002. The valve 10 is usable to control the flow of gas (such as air) into (or out of) the interior of the inner bladder 1002 to inflate (or deflate) the inner bladder 1002 and, therefore, to inflate (or deflate) the dunnage bag 1000. The outer bag 1004 may be made of one or more plies of any suitable material, such as paper, polypropylene, or polyethylene terephthalate. While the valve 10 is described below as attached to and used to inflate (or deflate) the dunnage bag 1000, the valve 10 can be attached to and be used to inflate (or deflate) any other suitable inflatable objects, such as (but not limited to) other types of inflatable bags, air mattresses, rafts, and tires.

As best shown in FIGS. 1-5, the valve 10 generally includes a housing 100, a sealing assembly 200, and a cap assembly 300. The housing 100 defines a gas passageway 190 through which gas can flow into (or out of) the dunnage bag 100 to inflate (or deflate) the dunnage bag 100. The sealing assembly 200 is mounted to the housing 100 and configured to open and close the gas passageway 190 and thus control whether gas can flow through the gas passageway 190 of the housing 100 into (or out of) the dunnage bag 1000. Specifically, the sealing assembly 200 is movable relative to the housing 100 between a closed configuration in which the sealing assembly 200 prevents gas flowing through the gas passageway 190 into (or out of) the dunnage bag 1000 and an open configuration in which the sealing assembly 200 enables gas to flow through the gas passageway 190 into (or out of) the dunnage bag 1000. The sealing assembly 200 is lockable in the open configuration to enable hands-free dunnage bag deflation. The cap assembly 300 is attachable to the housing 100 to help retain the valve 10 on the dunnage bag 1000. Part of the cap assembly 300 is mountable to the housing 100 to cover one end of the housing 100 to protect the gas passageway 190 from contaminants.

Figure 6:
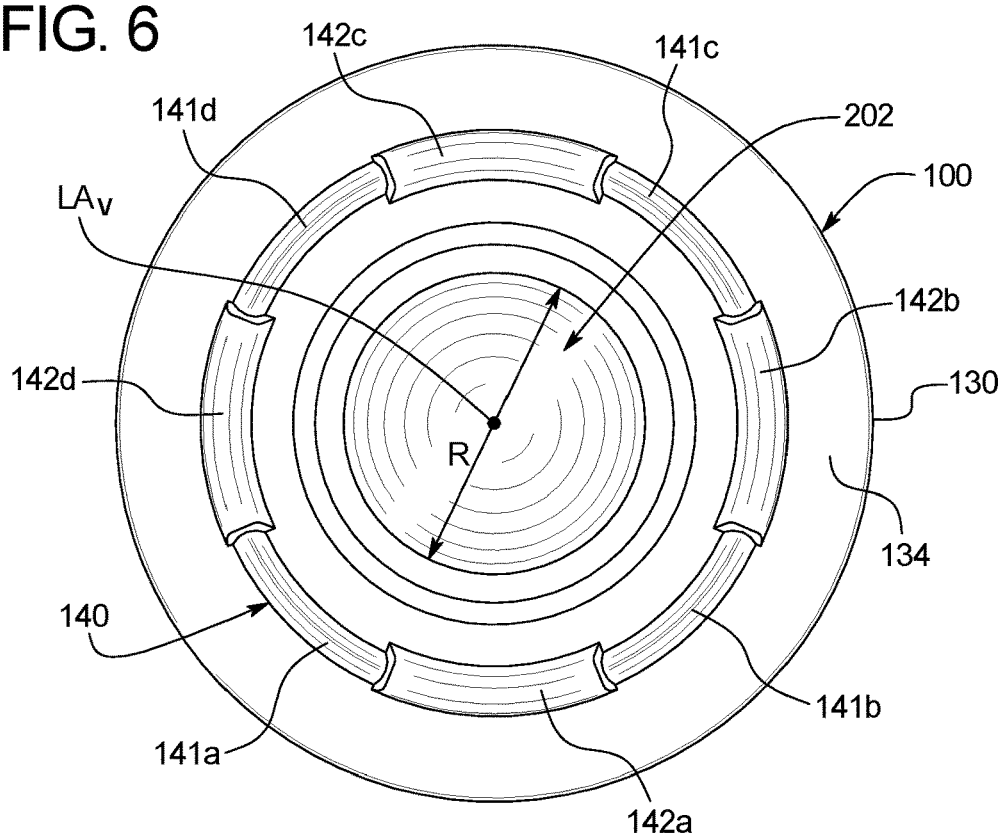
FIG. 6 is a bottom plan view of the housing of the valve of FIG. 1 with the sealing assembly mounted thereto.
Figure 7:
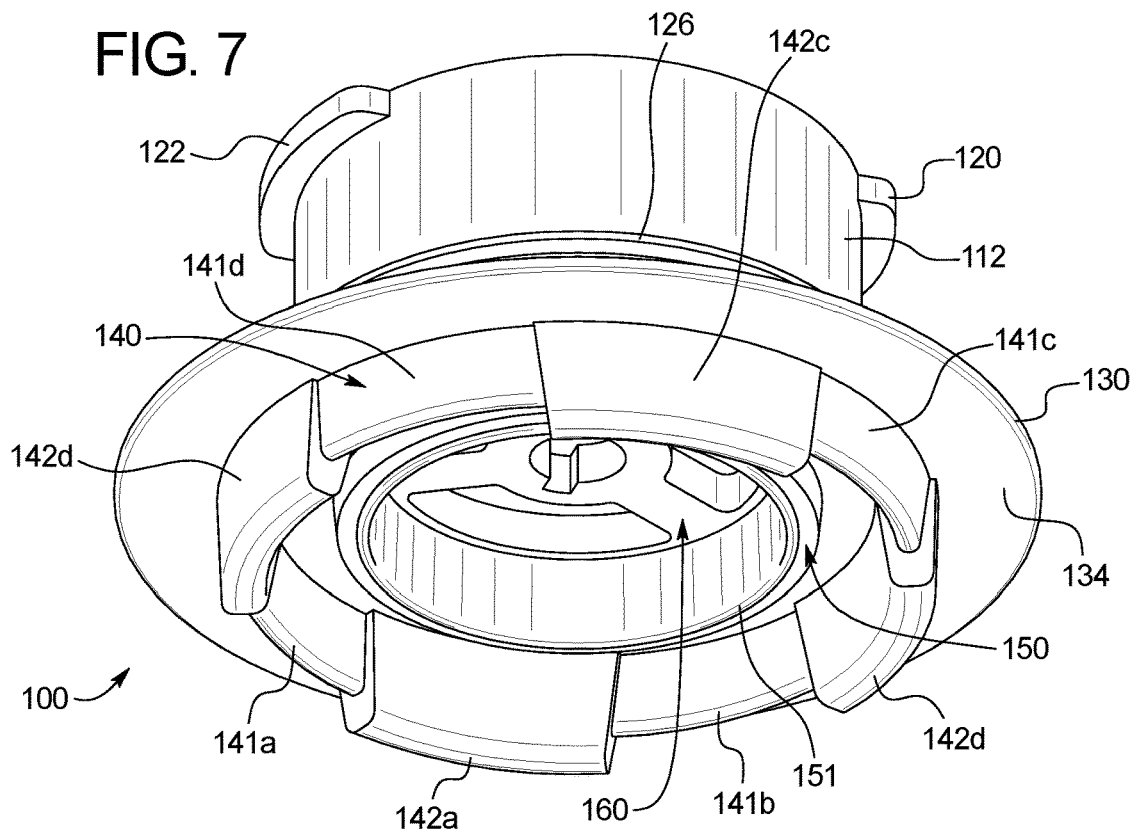
FIG. 7 is a bottom perspective view of the housing of the valve of FIG. 1.

As best shown in FIGS. 3, 6, 8, 10, and 12, the valve 10 has a longitudinal axis $LA_V$, the housing 100 has a longitudinal axis $LA_H$, and the sealing assembly 200 has a longitudinal axis $LA_S$. The longitudinal axes $LA_V$, $LA_H$, and $LA_S$ are coaxial. As used herein, the "axial direction" (and derivatives thereof) means the direction L parallel to the longitudinal axes $LA_V$, $LA_H$, and $LA_S$, as shown in FIG. 3. Additionally, as used herein, the "radial direction" (and derivatives thereof) means the direction R perpendicular to the longitudinal axes $LA_V$, $LA_H$, and $LA_S$, as shown in FIGS. 3 and 6.

As best shown in FIGS. 7-10, the housing 100 includes a body having an annular wall 112, cap engagers 120 and 122, first and second retaining rings 126 and 128, an attachment flange 130, a standoff 140, a sealing seat 150, and a stem supporter 160.

The annular wall 112 has opposing outer and inner cylindrical surfaces 114 and 116. The inner surface 114 partially defines the gas passageway 190.

The cap engagers 120 and 122 are integrally connected to and extend radially outward from circumferentially opposed portions of the outer surface 114 of the annular wall 112. The cap engagers 120 and 122 are sized, shaped, positioned, and otherwise configured to be engaged by the cap 350 of the cap assembly 300 (as best shown in FIGS. 1, 2, and 3) to mount the cap 350 to the housing 100, as described in more detail below.

Each of the first and second retaining rings 126 and 128 is integrally connected to and extends radially outward from the outer surface 114 of the annular wall 112. The first and second retaining rings 126 and 128 are axially spaced-apart a distance that is at least as large as the thickness of the attachment lips 316a-316f of the attacher 310 of the cap assembly 300 (as described below).

The attachment flange 130 is annular and is integrally connected to and extends radially outward from the outer surface 114 of the annular wall 112. The attachment flange 130 has opposing first and second surfaces 132 and 134. The attachment flange 130 is sized, shaped, positioned, and otherwise configured such that the surface 132 of the attachment flange 130 can engage and be sealed to the inner surface 1002a of the inner bladder 1002 of the dunnage bag 1000 in an airtight manner, such as via heat sealing or ultrasonic welding. As best shown in. FIG. 3, when the valve 10 is attached to the dunnage bag 1000, the portions of the housing 100 extending from the surface 134 of the flange 130 are positioned inside the dunnage bag 1000, and the portions of the housing 100 extending from surface 132 of the flange 130 are positioned outside of the dunnage bag 1000.

Figure 8:
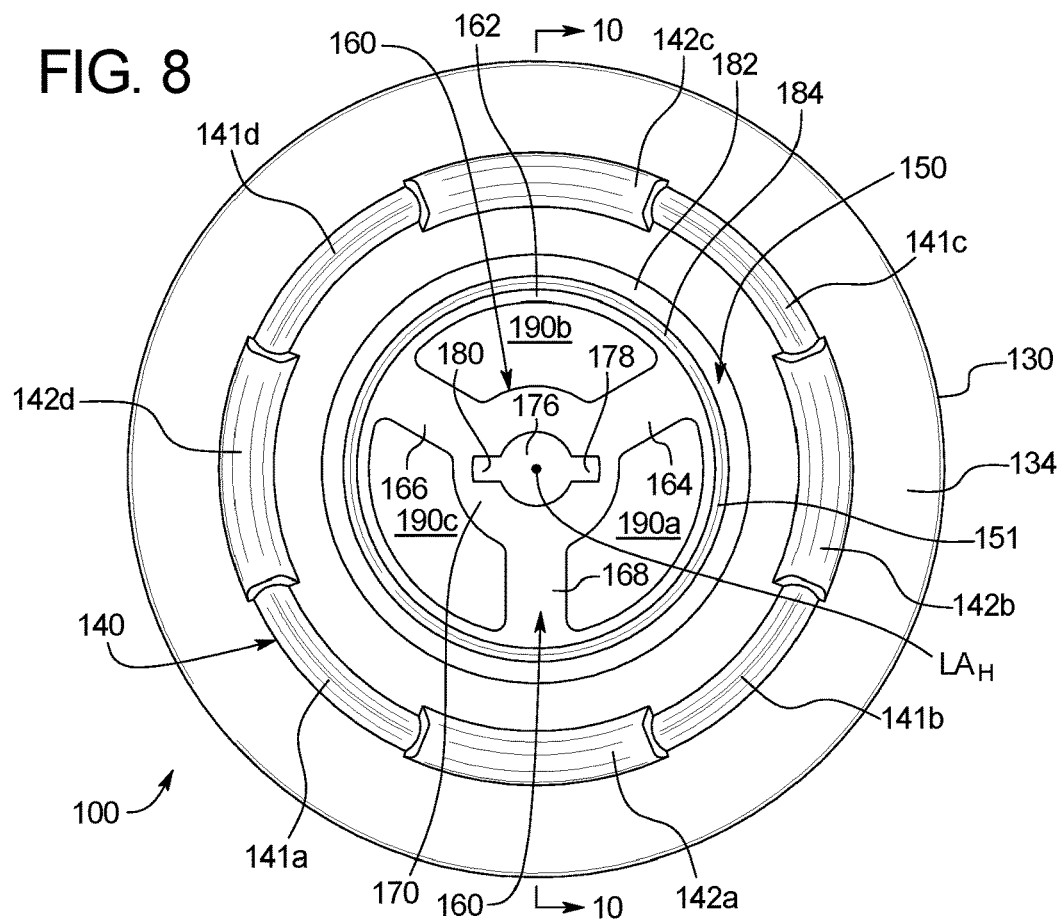
FIG. 8 is a bottom plan view of the housing of FIG. 7.
Figure 9:
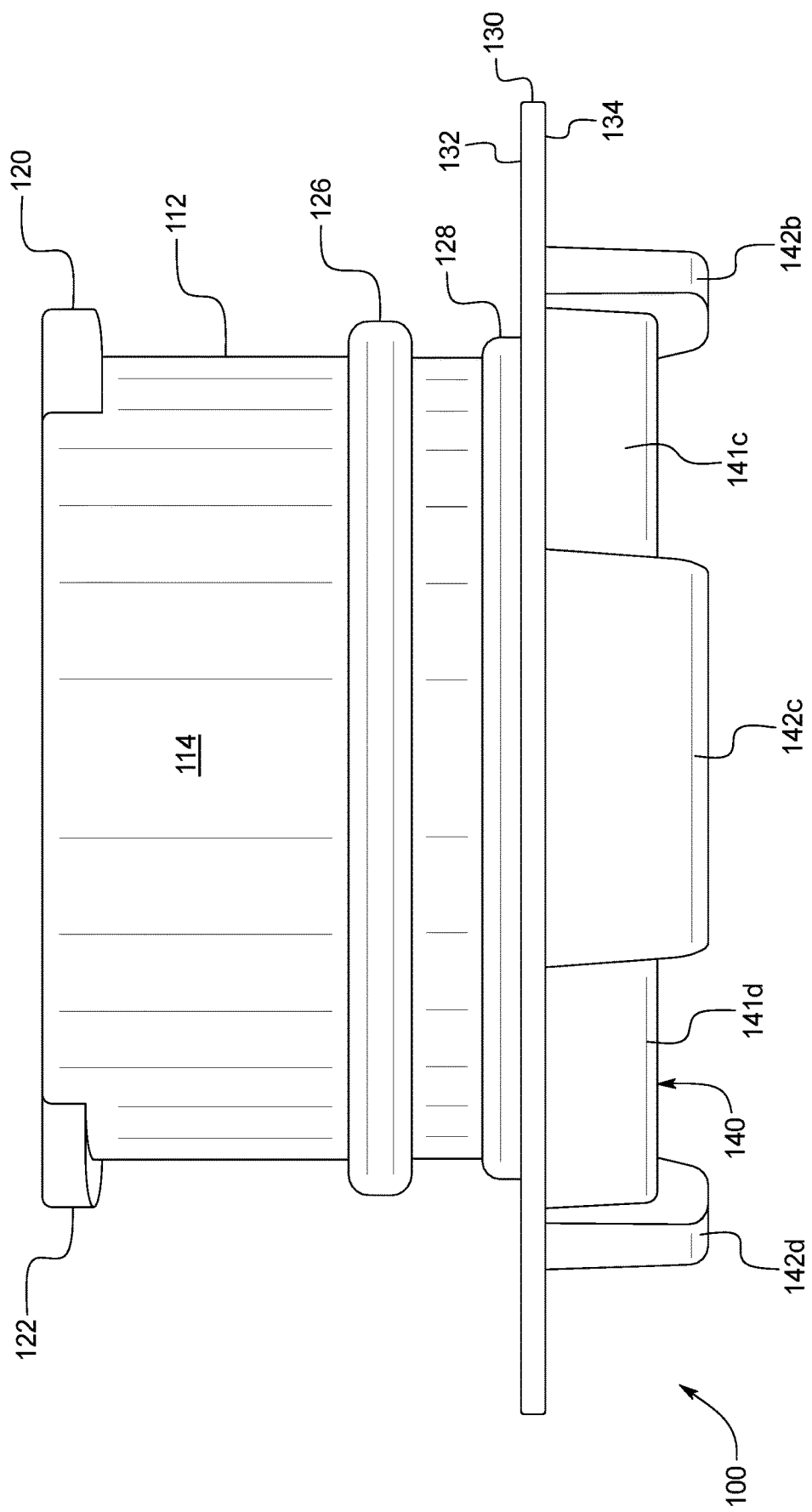
FIG. 9 is a side elevational view of the housing of FIG. 7.

The standoff 140 is generally annular and is integrally connected to and extends axially downward from the surface 134 of the flange 130. The standoff 140 is configured to prevent the inner surface 1002a of the inner bladder 1002 of the dunnage bag 1000 from sealing itself to the portion of the valve 10 that is inside the dunnage bag 1000 during dunnage bag deflation, which would prevent gas from escaping the dunnage bag 1000 through the gas passageway 190 (and thus prevent deflation). The standoff 140 includes a plurality of circumferentially spaced-apart first standoff members 141a, 141b, 141c, and 141d integrally connected to and extending axially downward from the surface 134 of the flange 130. The standoff 140 also includes a plurality of circumferentially spaced-apart second standoff members 142a, 142b, 142c, and 142d integrally connected to and extending axially downward from the surface 134 of the flange 130. The plurality of spaced-apart second standoff members 142a, 142b, 142c, and 142d are also respectively integrally connected to the first standoff members 141a, 141b, 141c, and 141d (as best shown in FIGS. 8 and 9). The second standoff members 142a, 142b, 142c, and 142d extend further downward from the flange 130 in the axial direction than the first standoff members 141a, 141b, 141c, and 141d to provide a plurality of air gaps in the event that the inner wall 1002a of the inner bladder 1002 engages the standoff 140 during deflation of the dunnage bag 1000. This is merely one example standoff, and the valve may include any other suitable standoff (or no standoff) in other embodiments.

The sealing seat 150 is generally annular and is integrally connected to and extends axially downward from the surface 134 of the flange 130. The sealing seat 150 is configured to be sealingly engaged by the sealing assembly 200 to close the gas passageway 190. More specifically, the sealing seat 150 includes an annular sealing lip 151 sized, shaped, positioned, and otherwise configured to be sealingly engaged by the sealing element 240 of the sealing assembly 200 (described below), as best shown in FIG. 3, to create an airtight seal between the sealing assembly 200 and the housing 100 to prevent gas from flowing through the gas passageway 190 into (or out of) the dunnage bag 1000 when the sealing assembly 200 is in the closed configuration, as further described below.

Figure 10:
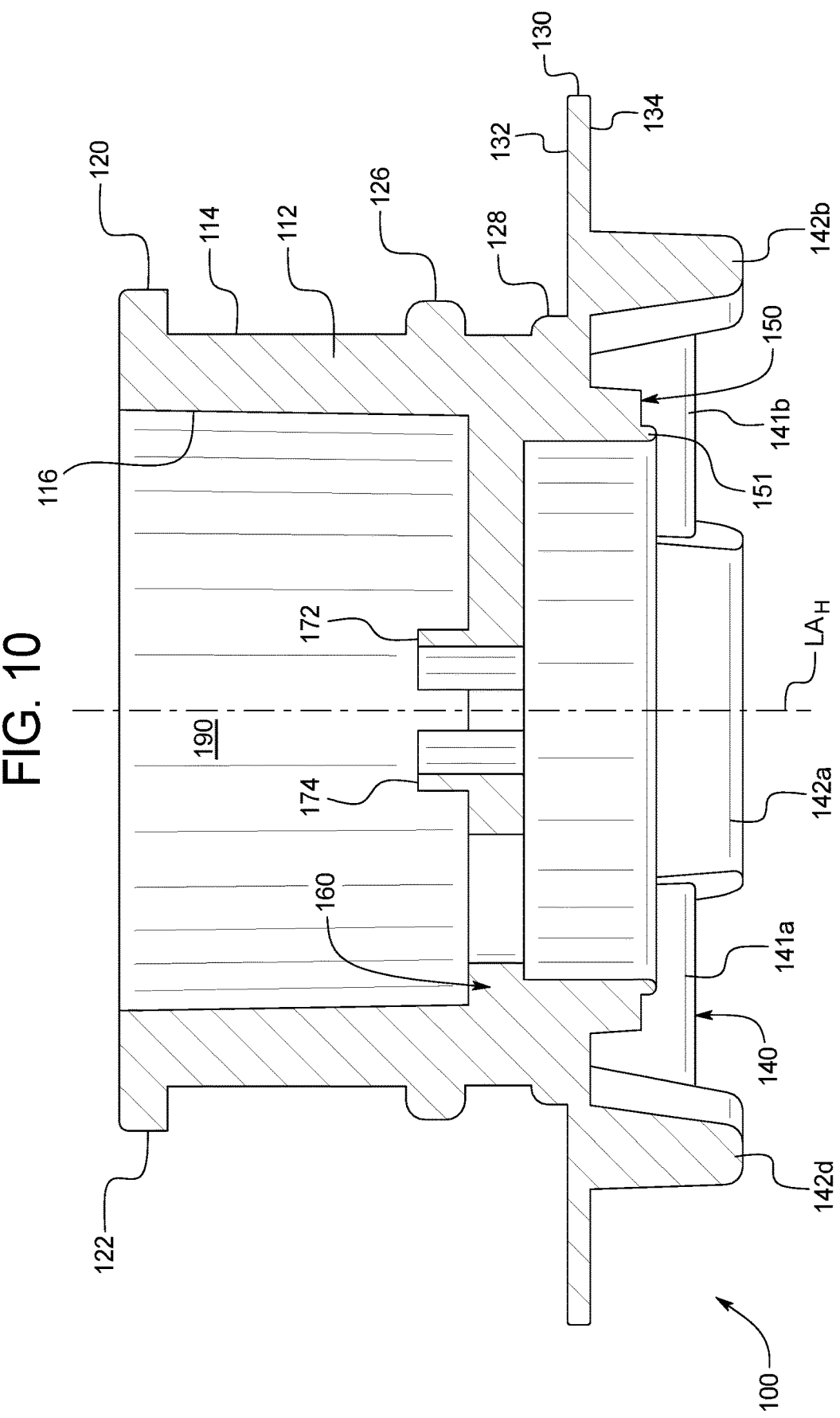
FIG. 10 is a cross-sectional side elevational view of the housing of FIG. 7 taken substantially along line 10-10 of FIG. 8.

The stem supporter 160 is integrally connected to and extends radially inward from the inner surface 116 of the annular wall 112. As best shown in FIGS. 8 and 10, the stem supporter 160 includes an outer ring 162; a plurality of circumferentially spaced-apart arms 164, 166, and 168; an inner ring 170; and spring-retaining elements 172 and 174. The outer ring 162 is integrally connected to and extends radially inward from the inner surface 116 of the annular wall 112. The arms 164, 166, and 168 are integrally connected to and extend radially inward from the outer ring 162. The inner ring 170 is integrally connected to and extends radially inward from each of the arms 164, 166, and 168. The inner ring 170 defines a central shaft-receiving opening 176 having its center positioned on the longitudinal axis $LA_H$ of the housing 100. The shaft-receiving opening 176 is sized to receive the shaft 220 of the stem 202 and to enable the shaft 220 to axially move through the stem supporter 160 and rotate relative to the stem supporter 160, as further described below. The inner ring 170 further defines circumferentially spaced-apart locking-rib-receiving openings 178 and 180 sized to receive the locking ribs 228 and 230 of the stem 202 and to enable the locking ribs 228 and 230 to axially move therethrough, as further described below. The spring-retaining elements 172 and 174 are integrally connected to and extend axially upward from the inner ring 170. The spring-retaining elements 172 and 174 are configured to radially retain the spring 270 in place on the housing 100, as described below.

The arms 164, 166, and 168 and the inner ring 170 define three spaced-apart gas-passage openings 190a, 190b, and 190c that also partially define the gas passageway 190 of the housing 100. The gas passage openings 190a, 190b, and 190c enable a significant amount of gas to pass though the housing 100 and thus the valve 10 when the sealing assembly 200 is in the open configuration during inflation or deflation of the dunnage bag 1000. In this illustrated example embodiment, the gas passage openings 190a, 190b, and 190c are sized such that the rate of gas flow provided by valve 10 is approximately 25% greater than various known valves.

In this illustrated embodiment, the housing 100 is one piece and molded from plastic (such as polyethylene). The housing can be made from other suitable materials, made in other suitable manners, and made from two or more connectable pieces in accordance with the present disclosure.

As best shown in FIGS. 3 to 6 and 11 to 22, the sealing assembly 200 has a longitudinal axis $LA_S$ and includes a stem 202, a sealing element 240 mountable to the stem 202, a retaining plate 250 mountable to the stem 202 to retain the sealing element 240 on the stem 202, a spring 270 (or any other suitable biasing element) to bias the sealing assembly 200 to the closed configuration when mounted to the housing 100, and a locking element 280 attachable to the stem 202 to retain the stem 200 on the housing 100.

Figure 11:
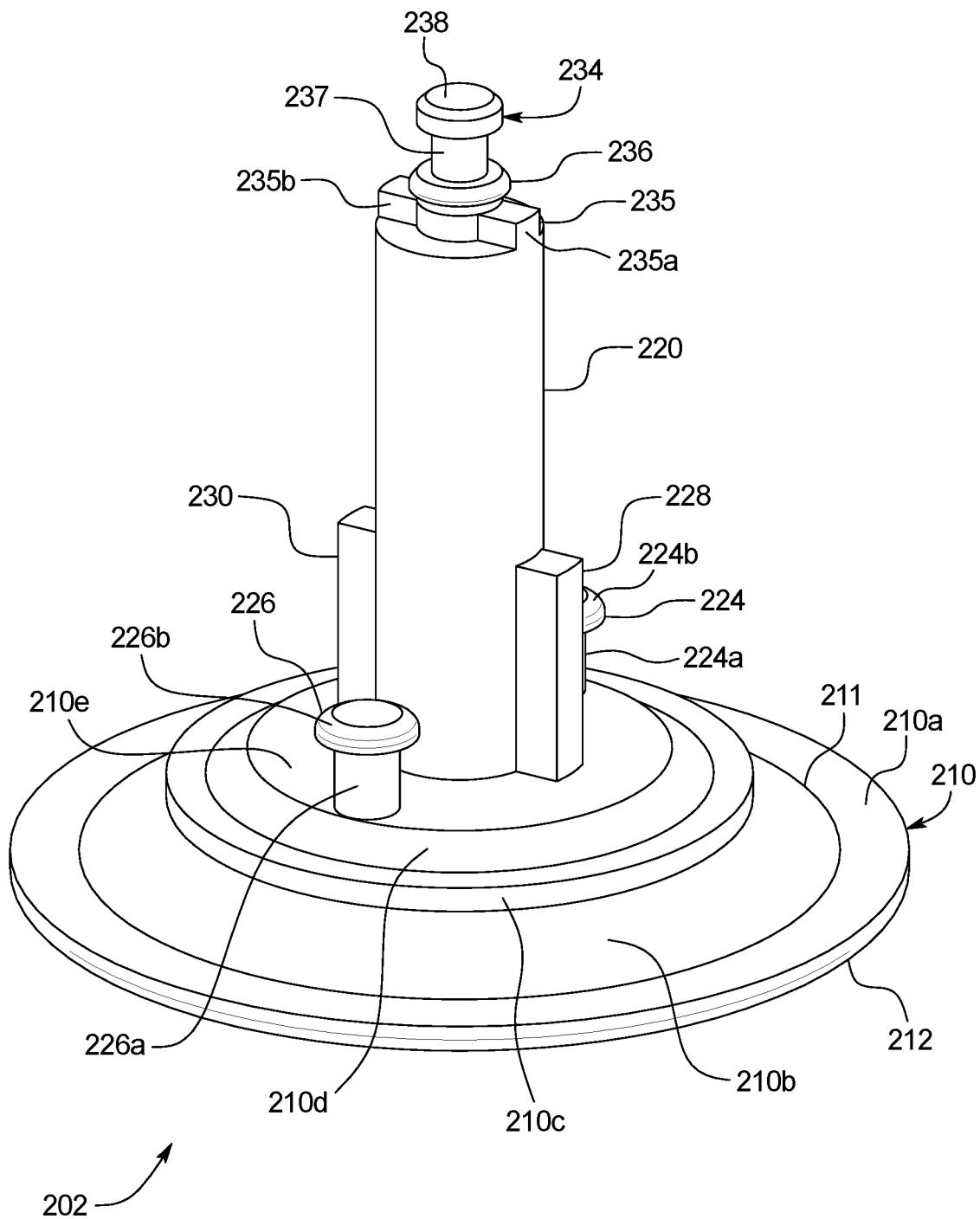
FIG. 11 is a top perspective view of the stem of the sealing assembly of the valve of FIG. 1.
Figure 12:
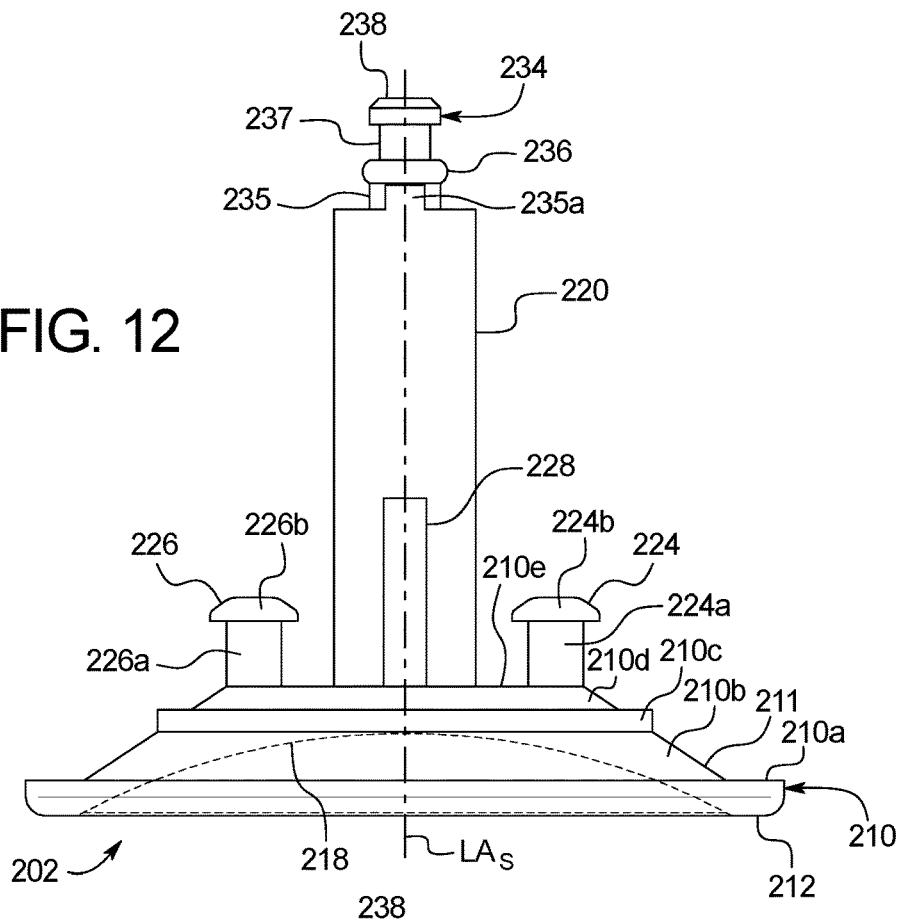
FIG. 12 is a side elevational view of the stem of FIG. 11.
Figure 13:
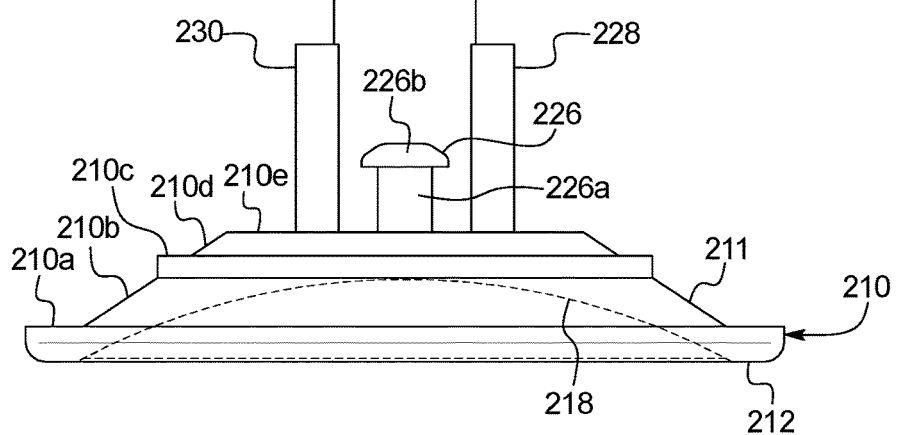
FIG. 13 is another side elevational view of the stem of FIG. 11.

As best shown in FIGS. 11-13, the stem 202 includes a body having a base 210, a shaft 220, first and second mounting studs 224 and 226, first and second locking ribs 228 and 230, and a locking-element engager 234.

The base 210 is generally conical and has a first side 211 and an opposite second side 212. The base 210 includes an annular first (or outer) ring 210a, an annular second (or first intermediate) ring 210b integrally connected to and extending radially inward and axially upward from the outer ring 210a, an annular third (or second intermediate) ring 210c integrally connected to and extending radially inward from the second ring 210b, an annular fourth (or third intermediate) ring 210d integrally connected to and extending radially inward and axially upward from the third ring 210c, and an annular fifth (or inner) ring 210e integrally connected to and extending radially inward from the fourth ring 210d. The second side 212 of the base 210 includes a generally concave portion 218. This concave shape saves material (and therefore manufacturing costs) and reduces the forces necessary to move the sealing assembly 200 from the closed configuration to one of the open configurations (as compared to an embodiment in which the portion 218 is planar rather than concave).

The shaft 220 of the stem 202 is generally cylindrical, and is integrally connected to and extends axially upward from the center of the first side 211 of the base 210 (and particularly from the fifth ring 210e of the base 210). The shaft 220 is sized, shaped, positioned, and otherwise configured to be received in and axially reciprocate through the shaft-receiving opening 176 defined by the inner ring 170 of the stem supporter 160 of the housing 100.

The first and second mounting studs 224 and 226 of the stem 202 are each generally mushroom shaped. The first and second mounting studs 224 and 226 are integrally connected to and extend axially upward from circumferentially opposed portions of the first side 211 of the base 210 (and particularly from the fifth ring 210e of the base 210). More specifically, the first mounting stud 224 includes a cylindrical first neck 224a integrally connected to and extending axially upward from the first side 211 of the base 210 (and particularly from the fifth ring 210e of the base 210) and a dome-shaped first head 224b that has a greater outer diameter than the first neck 224a and that is integrally connected to and extends axially upward and radially outward from the first neck 224a. Likewise, the second mounting stud 226 includes a cylindrical second neck 226a integrally connected to and extending axially upward from the first side 211 of the base 210 (and particularly from the fifth ring 210e of the base 210) and a dome shaped second head 226b that has a greater outer diameter than the second neck 226a and that is integrally connected to and extends axially upward and radially outward from the second neck 226a. The first and second mounting studs 224 and 226 are sized, shaped, positioned, and otherwise configured to retain the sealing element 240 and the retaining element 250 on the stem 202, as further described below.

The first and second locking ribs 228 and 230 of the stem 202 are integrally connected to and extend axially upward from circumferentially opposed portions of the first side 211 of the base 210 (and particularly from the cylindrical fifth ring 210e of the base 210). The first and second locking ribs 228 and 230 are also integrally connected to extend radially outward from circumferentially opposed portions of the shaft 220. The first and second locking ribs 228 and 230 are sized, shaped, positioned, and otherwise configured to be received in and axially reciprocate through the locking-rib-receiving openings 178 and 180, respectively, defined by the inner ring 170 of the stem supporter 160 of the housing 100.

The locking-element engager 234 is sized, shaped, positioned, and otherwise configured to be engaged by the locking element 280 and to retain the locking element 280 in place to maintain the spring 270 in place and to maintain the stem 202 mounted to the housing 100, as best shown in FIG. 3. The locking-element engager 234 is integrally connected to and extends axially upward from the end of the shaft 220 opposite the base 210. The longitudinal axis (not shown) of the locking-element engager 234 is coaxial with the longitudinal axis $LA_S$ of the sealing assembly 200. The locking-element engager 234 includes an engager body 235 having engager shoulders 235a and 235b, an engager ring 236, an engager neck 237, and an engager head 238.

In this illustrated embodiment, the stem 202 is one piece and molded from plastic (such as polyethylene). The stem can be made from other suitable materials, made in other suitable manners, and made from two or more connectable pieces in accordance with the present disclosure.

Figure 14:
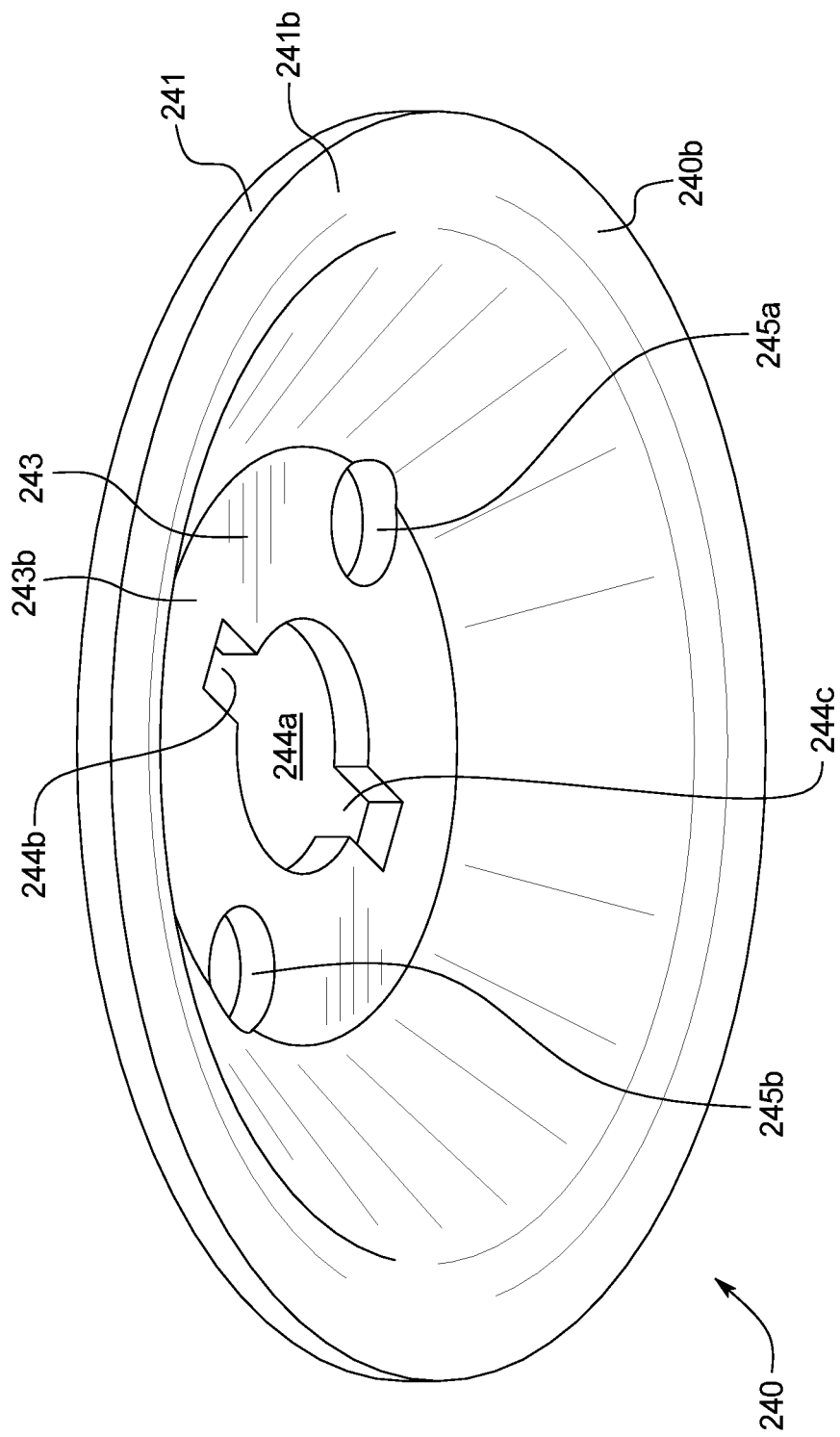
FIG. 14 is a bottom perspective view of the sealing element of the sealing assembly of the valve of FIG. 1.
Figure 15:
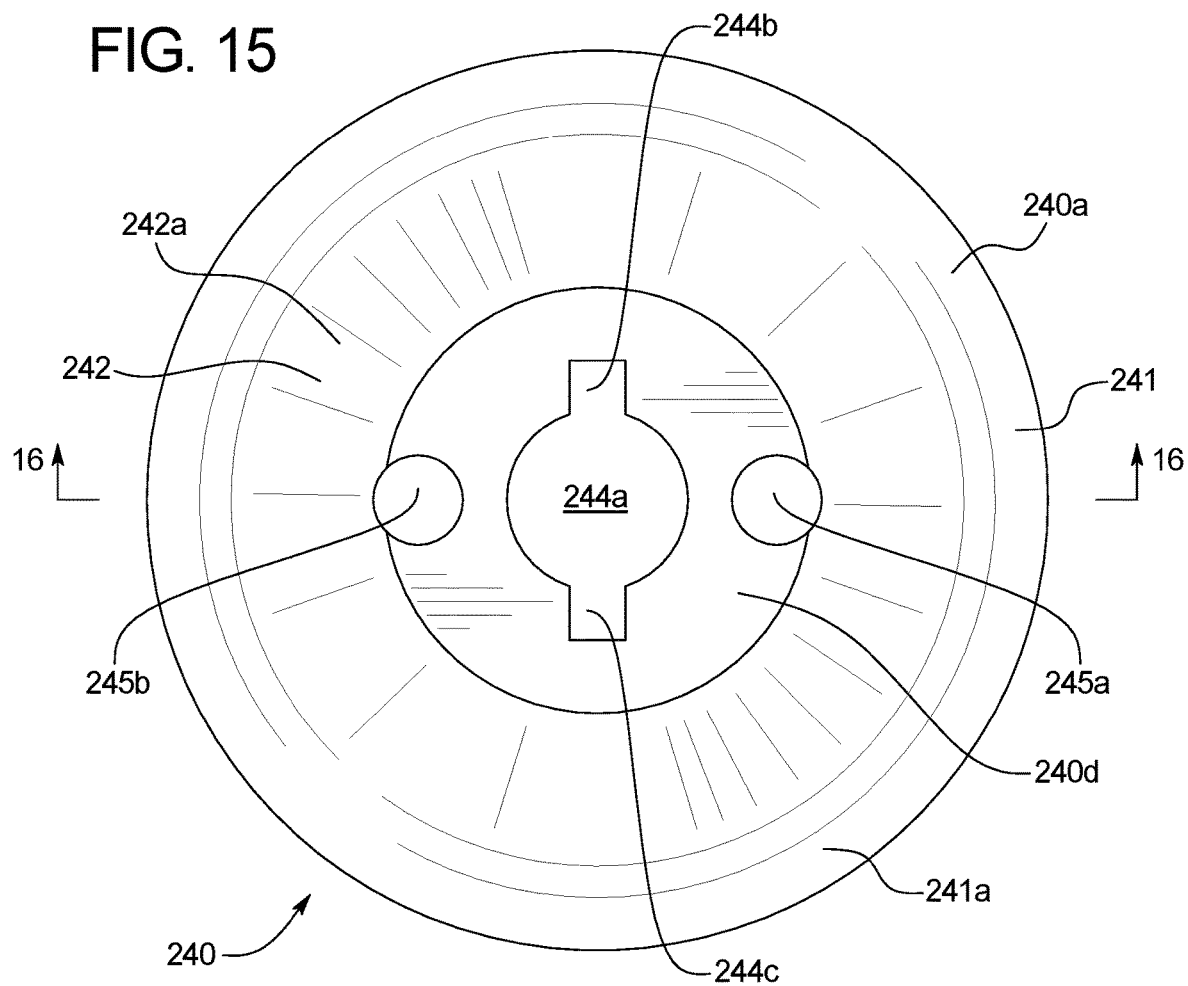
FIG. 15 is a bottom plan view of the sealing element of FIG. 14.
Figure 16:
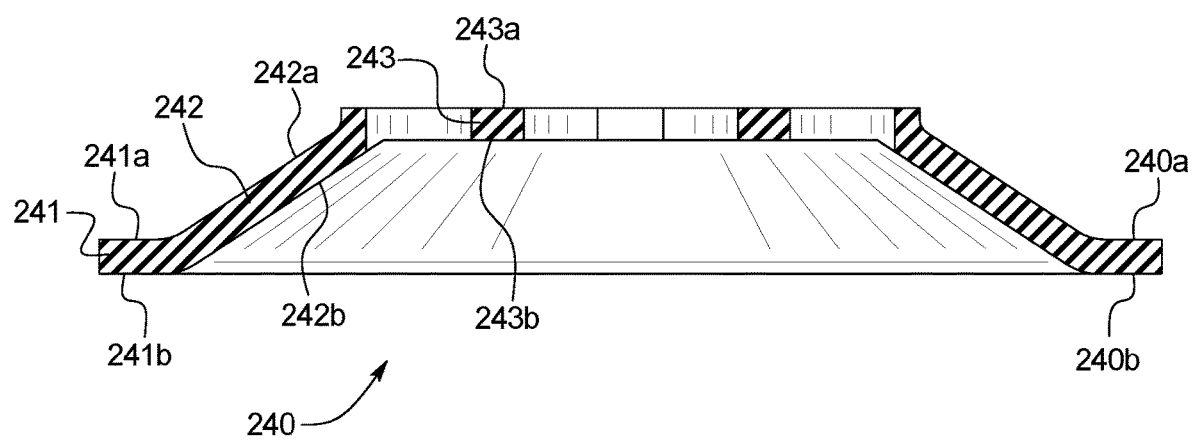
FIG. 16 is a cross-sectional side elevational view of the sealing element of FIG. 14 taken substantially along line 16-16 of FIG. 15.

As best shown in FIGS. 14-16, the sealing element 240 is generally conical and has a first side 240a and an opposite second side 240b. The sealing element 240 generally includes an outer (or first ring) 241, an intermediate (or second) ring 242, and an inner (or third ring) 243. The outer ring 241 is generally annular and includes a first surface 241a and an opposing second surface 241b. The intermediate ring 242 is integrally connected to and extends axially upward and radially inward from the outer ring 241 and includes a first surface 242a and an opposing second surface 242b. The inner ring 243 is integrally connected to and extends radially inward from the intermediate ring 242 and includes a first surface 243a and an opposing second surface 243b. The inner ring 243 defines a central shaft-receiving opening 244a sized, shaped, positioned, and otherwise configured to receive the shaft 220. The inner ring 243 further defines circumferentially opposed locking-rib-receiving openings 244b and 244c sized, shaped, positioned, and otherwise configured to respectively receive the locking ribs 228 and 230. The inner ring 243 further defines circumferentially opposed mounting stud receiving openings 245a and 245b sized, shaped, positioned, and otherwise configured to respectively receive the mounting studs 224 and 226.

The sealing element 240 is made from or includes a flexible, compressible material, such as a vulcanized elastomer, a thermoplastic vulcanizate, or any other suitable elastomer. Some suitable materials for the sealing element are nitrile rubber (Code NBR 40) and SANTOPRENE (SANTOPRENE is a registered trademark of Monsanto Company Corporation). Any other suitable materials can be employed for the sealing element so long as those materials provide a sealing engagement with the sealing lip 151 when the sealing assembly 200 is in the closed configuration.

Figure 17:
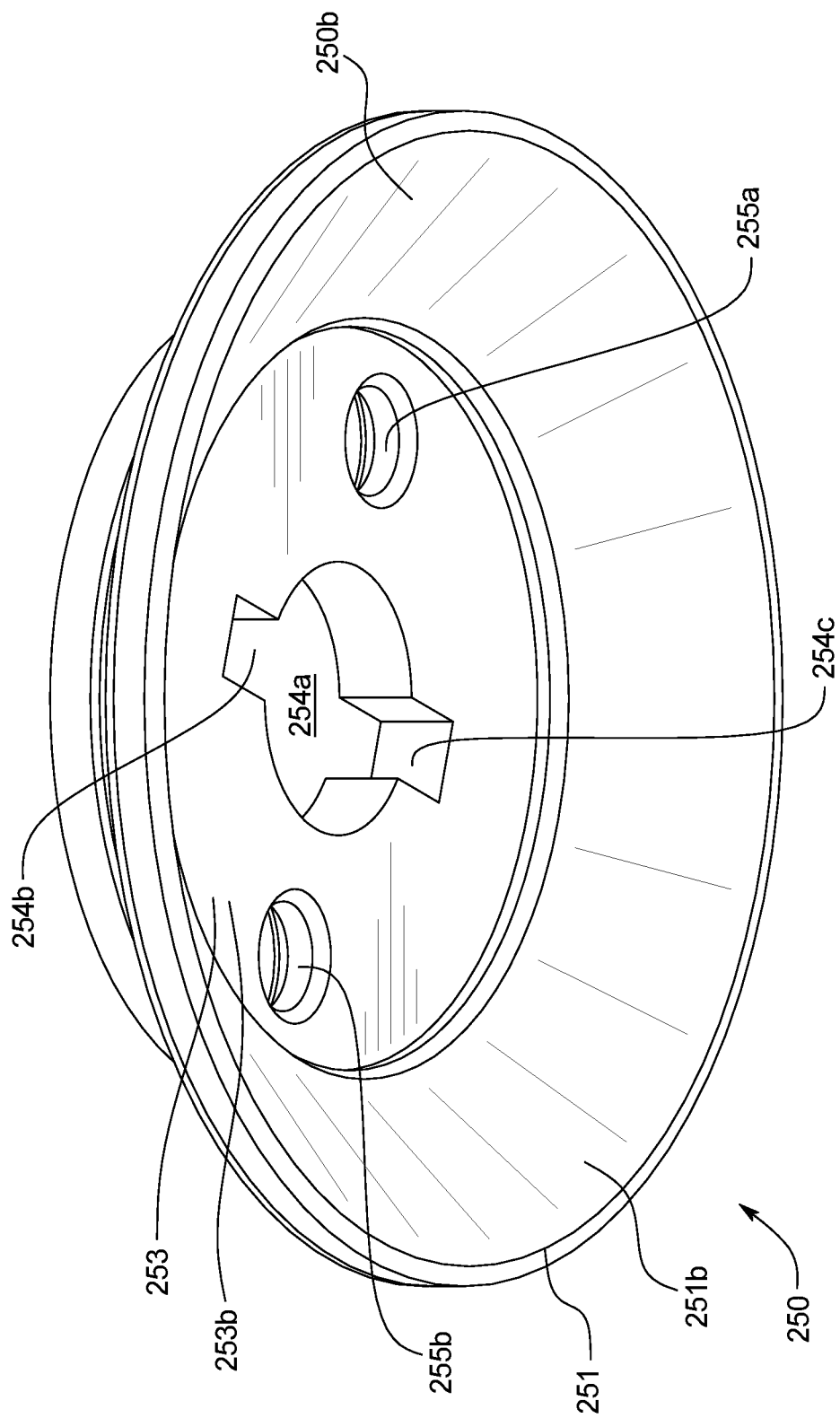
FIG. 17 is a bottom perspective view of the retaining element of the sealing assembly of the valve of FIG. 1.
Figure 18:
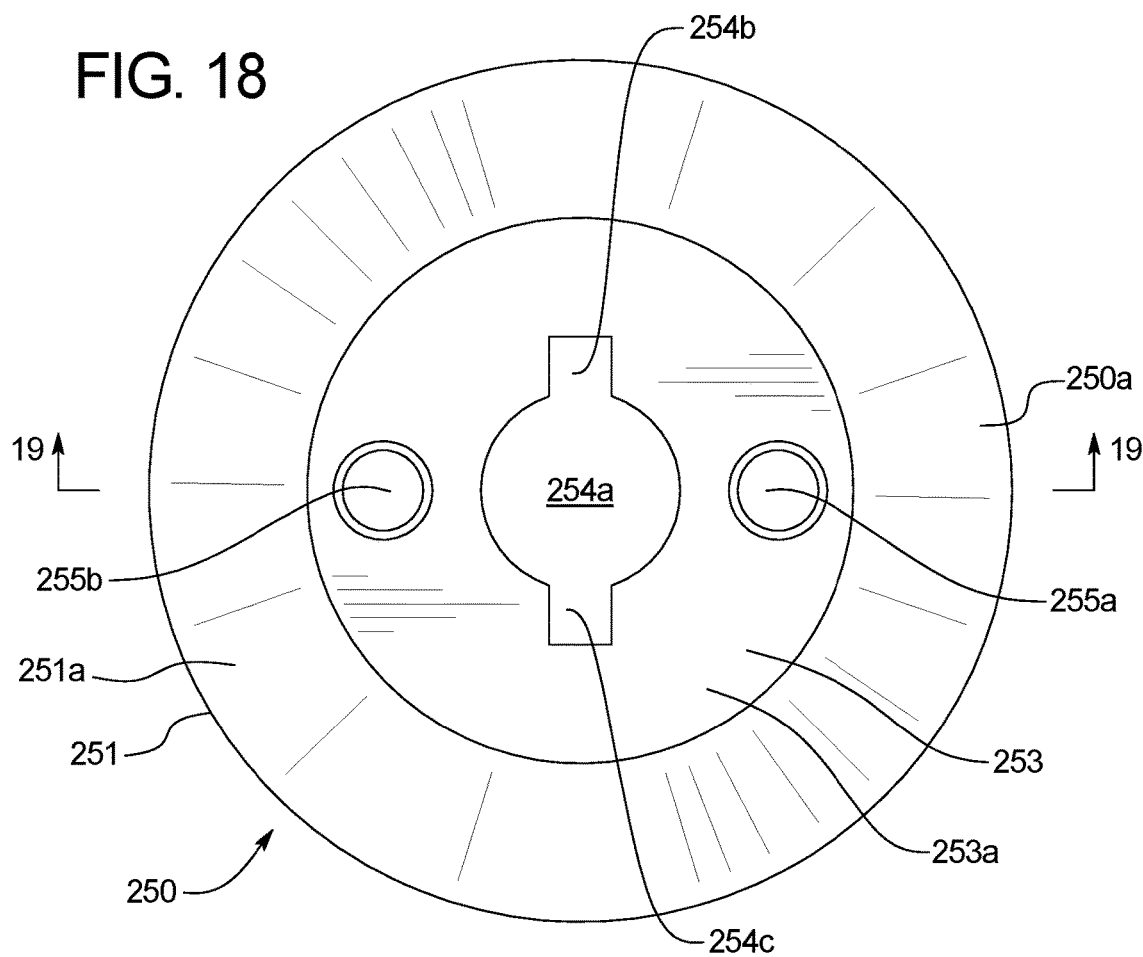
FIG. 18 is a bottom plan view of the retaining element of FIG. 17.
Figure 19:
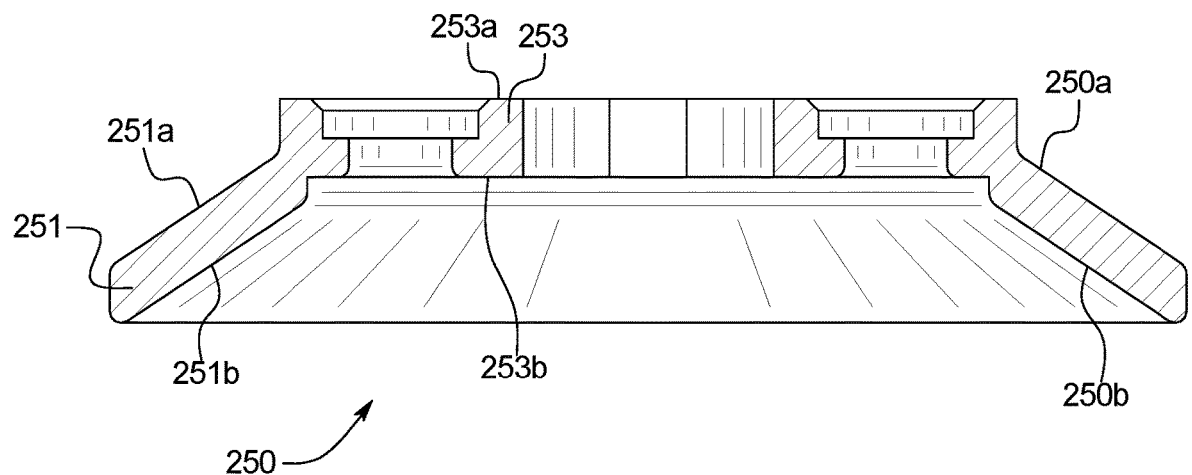
FIG. 19 is a cross-sectional side elevational view of the retaining element of FIG. 17 taken substantially along line 19-19 of FIG. 18.

As best shown in FIGS. 17-19, the retaining element 250 is generally conical and has a first side 250a and an opposite second side 250b. The retaining element 250 generally includes an outer (or first) ring 251 and an inner (or second) ring 253. The outer ring 251 is generally conical, and includes a first surface 251a and an opposing second surface 251b. The inner ring 253 is integrally connected to and extends radially inward from the outer ring 251 and includes a first surface 253a and an opposing second surface 253b. The inner ring 253 defines a central shaft-receiving opening 254a sized, shaped, positioned, and otherwise configured to receive the shaft 220 of the stem 202. The inner ring 253 further defines circumferentially opposed locking-rib-receiving openings 254b and 254c shaped, positioned, and otherwise configured to respectively receive the locking ribs 228 and 230 of the stem 202. The inner ring 253 further defines circumferentially opposed mounting-stud-receiving openings 255a and 255b shaped, positioned, and otherwise configured to respectively receive the mounting studs 224 and 226 of the stem 202.

In this illustrated embodiment, the retaining element 250 is one piece and molded from plastic (such as polyethylene). The retaining element can be made from other suitable materials, made in other suitable manners, and made from two or more connectable pieces in accordance with the present disclosure.

Figure 20:
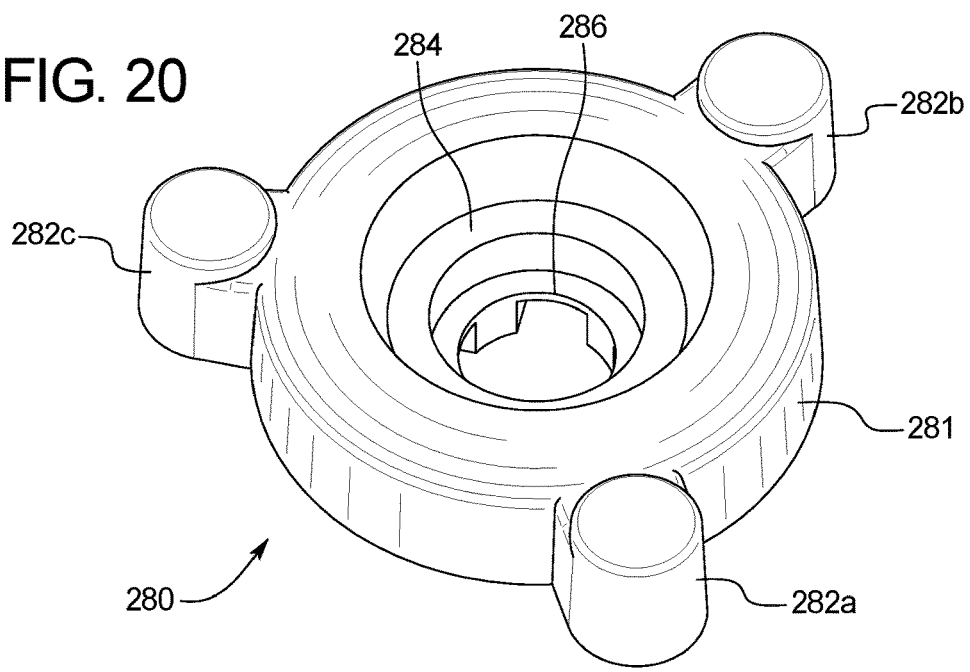
FIG. 20 is a top perspective view of the locking element of the sealing assembly of the valve of FIG. 1.
Figure 21:
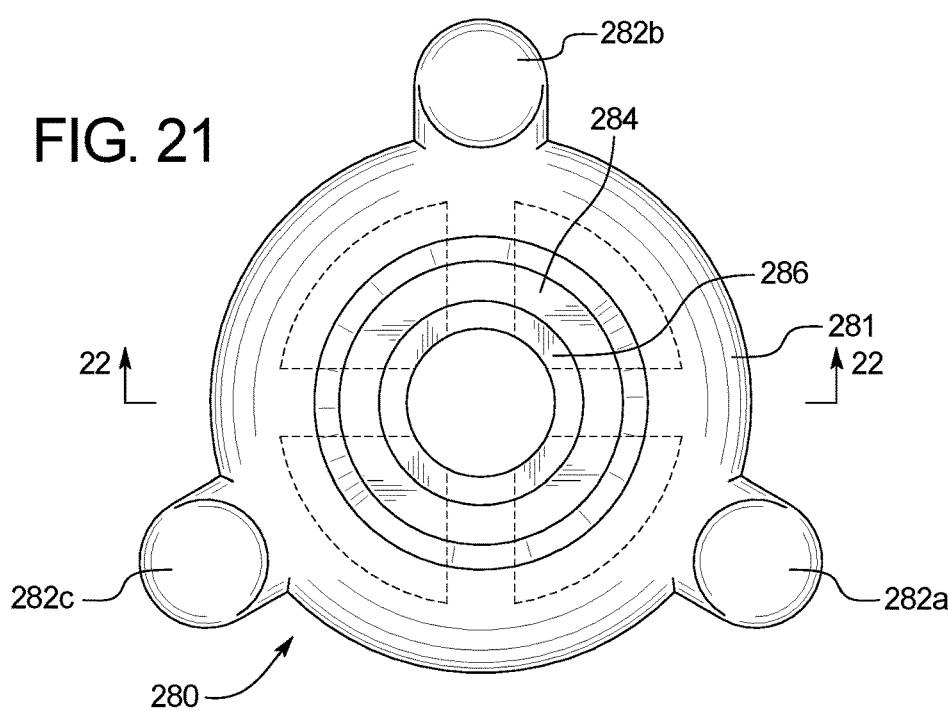
FIG. 21 is a top plan view of the locking element of FIG. 20.
Figure 22:
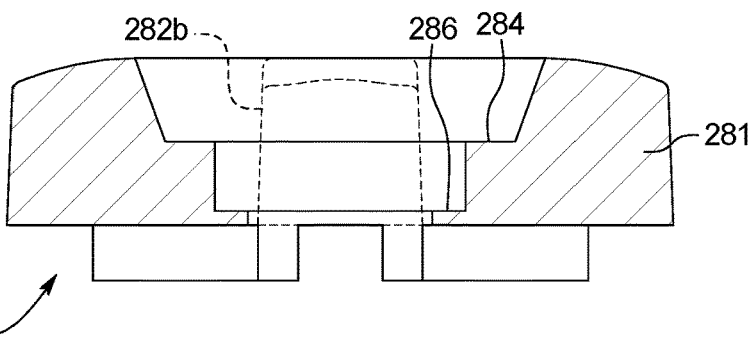
FIG. 22 is a cross-sectional side elevational view of the locking element of FIG. 20 taken substantially along line 22-22 of FIG. 21.

As best shown in FIGS. 20-22, the locking element 280 is connectable to the locking-element engager 234 of the stem 202 to retain the spring 270 between the housing 100 and the locking element 280 and therefore retain the stem 202 on the housing 100. The locking element 280 includes a generally annular body 281 and three cylindrical, circumferentially spaced-apart gripping tabs 282a, 282b, and 282c integrally connected to and extending radially outward from the body 281. The gripping tabs 282a, 282b, and 282c are sized, shaped, positioned, and otherwise configured to enable a user or a suitable device (an inflation device) to engage the locking element 280 and move the locking element 280 (and thus the stem 202 connected thereto) axially downward and to rotate the locking element 280 (and thus the stem 202 connected thereto) after the locking ribs 228 and 230 are removed from the locking-rib-receiving openings 178 and 180. The body 281 includes an attachment base 284 that is sized, shaped, positioned, and otherwise configured to be attached to the locking-element engager 234 of the stem 202. The attachment base 284 includes an attachment shoulder 286 sized, shaped, positioned, and otherwise configured to engage the underside of the engager head 238 of the locking-element engager 234 to secure the locking element 280 to the locking-element engager 234 and thus to the stem 202. The body 281 defines four circumferentially spaced locking channels (not labeled) sized, shaped, positioned, and otherwise configured to receive and engage the engager shoulders 235a and 235b of the locking-element engager 234 to prevent the locking element 280 from rotating relative to the locking-element engager 234.

In this illustrated embodiment, the locking element 280 is one piece and molded from plastic (such as polyethylene). The locking element can be made from other suitable materials, made in other suitable manners, and made from two or more connectable pieces in accordance with the present disclosure.

Figure 4:
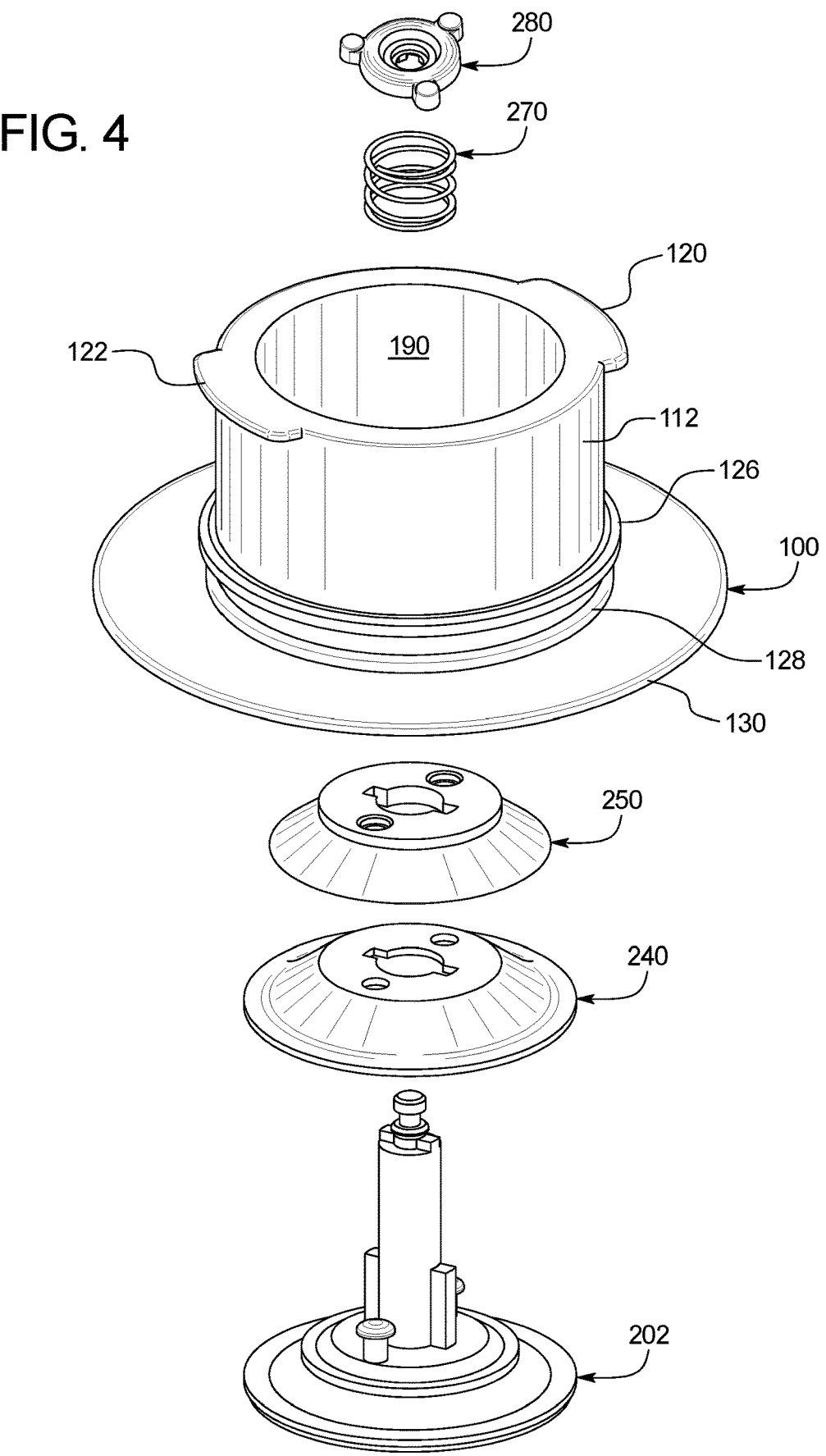
FIG. 4 is an exploded top perspective view of the housing and the sealing assembly of the valve of FIG. 1.
Figure 5:
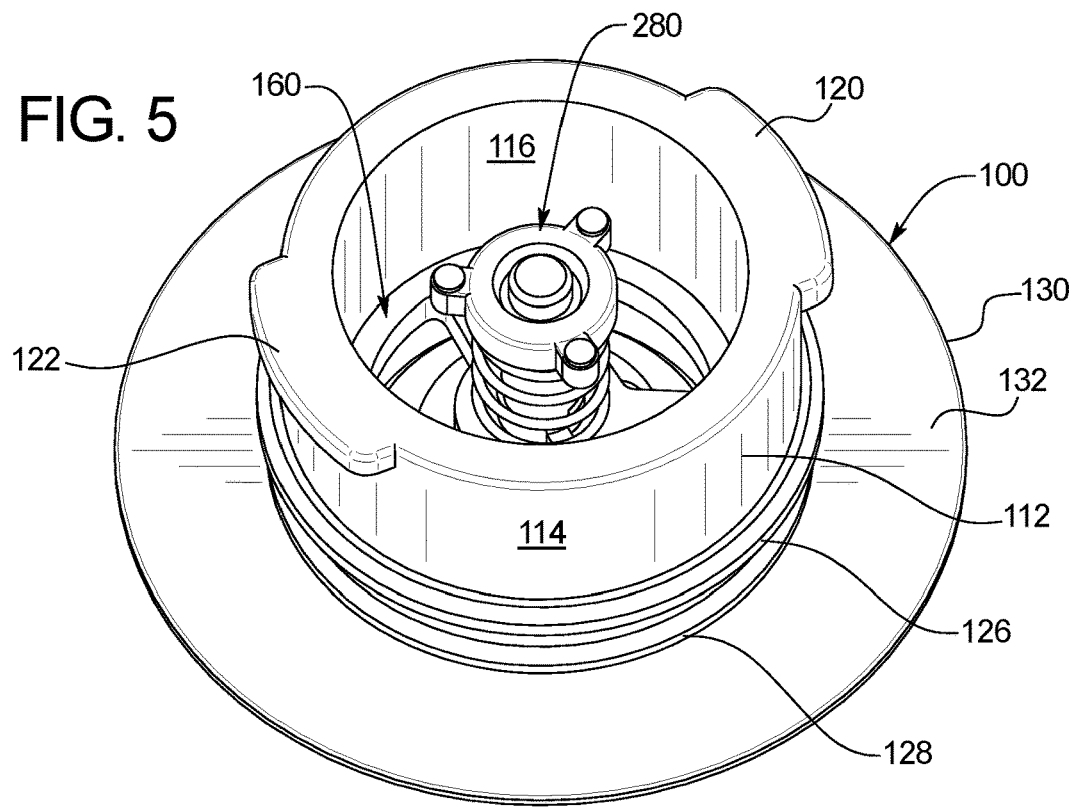
FIG. 5 is a top perspective view of the housing of the valve of FIG. 1 with the sealing assembly mounted thereto.

The sealing assembly 200 is mounted to the housing 100 as follows and as best shown in FIGS. 3 and 4. First, the sealing element 240 is mounted to the stem 202 by inserting the shaft 220 of the stem 202 through the shaft-receiving opening 244a of the sealing element 240, inserting the locking ribs 228 and 230 of the stem 202 through the locking-rib-receiving openings 244b and 244c of the sealing element 240, and inserting the mounting studs 224 and 226 of the stem 202 through the mounting stud receiving openings 245a and 245b of the sealing element 240 such that the second surfaces 241b, 242b, and 243b of the sealing element 240 engage the first side 211 of the base 210 of the stem 202.

Next, the retaining element 250 is mounted to the stem 202 atop the sealing element 240 by inserting the shaft 220 of the stem 202 through the shaft-receiving opening 254a of the retaining element 250, inserting the locking ribs 228 and 230 of the stem 202 through the locking-rib-receiving openings 254b and 254c of the retaining element 250, and inserting the mounting studs 224 and 226 of the stem 202 through the mounting stud receiving openings 255a and 255b of the retaining element 250 such that the second surfaces 251b and 253b of the retaining element 250 engage the first surfaces 241a, 242a, and 243a of the sealing element 240. The mushroom shaped heads 224b and 226b of the mounting studs 224 and 226 enable the sealing element 240 and the retaining element 250 to be mounted to the mounting studs 224 and 226 but prevent the sealing element 240 and the retaining element 250 from being removed from the mounting studs 224 and 226.

Next, the stem 202 (with the sealing element 240 and the retaining element 250 mounted thereto) is rotationally and axially positioned relative to the housing 100 such that the shaft 220 is received in the shaft-receiving opening 176 of the housing 100 and the locking ribs 228 and 230 are received in the locking-rib-receiving openings 178 and 180 of the housing 100.

The spring 270 is then positioned so it circumscribes the shaft 220 of the stem 202 and such that the bottom end (not labeled) of the spring 270 abuts the inner ring 170 of the stem supporter 160 of the housing 100 and circumscribes the spring-retaining elements 172 and 174 extending axially upward from the inner ring 170.

The locking element 280 is then connected to the locking-element engager 234 to constrain the spring 270 between the locking element 280 and the housing 100 (and, specifically, the inner ring 170 of the stem supporter 160 of the housing 100). When the locking element 280 is connected to the locking-element engager 234, the engager shoulders 235a and 235b of the locking-element engager 234 are received in and engage the locking channels of the locking element 280, which prevents the locking element 280 from rotating relative to the locking-element engager 234 (and therefore the stem 202).

As used herein with respect to this example embodiment, the stem assembly refers to the stem 202 with the sealing element 240, the retaining element 250, and the locking element 280 mounted thereto.

Once mounted to the housing 100 via the spring 270, the stem assembly is axially movable and rotatable relative to the housing 100 between a closed configuration in which the stem assembly prevents gas flowing through the gas passageway 190 into (or out of) the dunnage bag 1000 and an open configuration in which the stem assembly enables gas to flow through the gas passageway 190 into (or out of) the dunnage bag 1000. The stem assembly is rotatable to lock the stem assembly in the open configuration.

Figure 23:
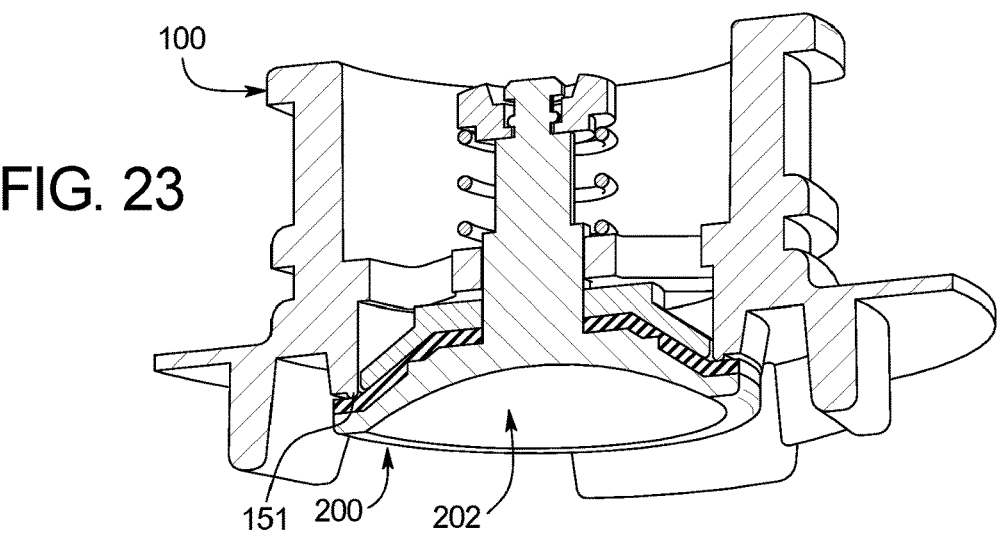
FIG. 23 is a cross-sectional perspective view of the housing of the valve of FIG. 1 with the sealing assembly mounted thereto and the stem assembly in the closed configuration.

FIGS. 3 and 23 best show the stem assembly (and thus the sealing assembly 200) in the closed configuration. In the closed configuration, the shaft 220 is received in the shaft-receiving opening 176 of the housing 100, the locking ribs 228 and 230 are received in the locking-rib-receiving openings 178 and 180 of the housing 100, and the spring 270 biases the stem assembly upward such that the sealing element 240 sealingly engages the sealing lip 151 of the housing 100. This sealing engagement prevents gas from flowing through the gas passageway 190 of the housing 100 into or out of the dunnage bag 1000. The fact that the locking ribs 228 and 230 are received in the locking-rib-receiving openings 178 and 180 prevents rotation of the stem assembly relative to the housing 100. The stem assembly can take one of multiple different closed positions when in the closed configuration. In one closed position the locking ribs 228 and 230 are respectively received in the locking-rib-receiving openings 178 and 180 of the housing 100, while in another closed position locking ribs 228 and 230 are received in the locking-rib-receiving openings 180 and 178.

Figure 24:
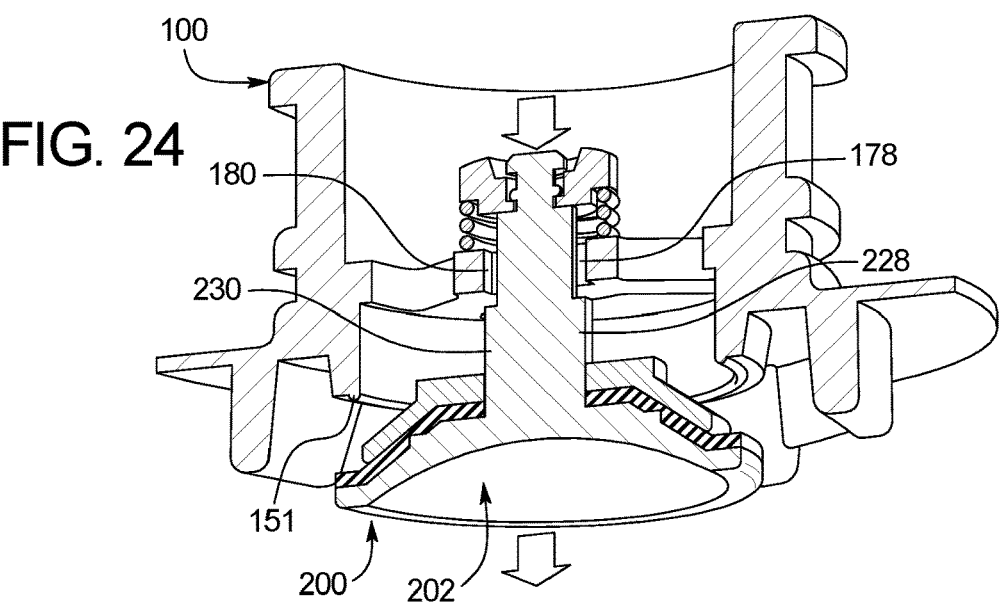
FIG. 24 is a cross-sectional perspective view of the housing of the valve of FIG. 1 with the sealing assembly mounted thereto and the stem assembly in an open configuration.

To move the stem assembly (and thus the sealing assembly 200) from the closed configuration to the open configuration, a user depresses the locking element 280 to overcome the biasing force of the spring 270 and move the stem assembly axially downward until the locking ribs 228 and 230 are removed from the locking-rib-receiving openings 178 and 180, as shown in FIG. 24. As this occurs, the sealing element 240 disengages the sealing lip 151, which enables gas to flow through the gas passageway 190 of the housing 100 into (or out of) the dunnage bag 1000. The stem assembly can take one of multiple different open unlocked positions when in the open configuration. In each open unlocked position, the stem assembly is axially positioned relative to the housing 100 such that the locking ribs 228 and 230 are removed from the locking-rib-receiving openings 178 and 180 of the housing 100 and do not contact the stem supporter 160. In other words, in an open unlocked position, the stem assembly is axially and rotationally positioned relative to the housing 100 such that the gas passageway 190 is open, but if the pressure on the stem assembly is released, the spring 270 will bias the stem assembly axially upward back into the closed configuration to close the gas passage way 190.

Figure 25:
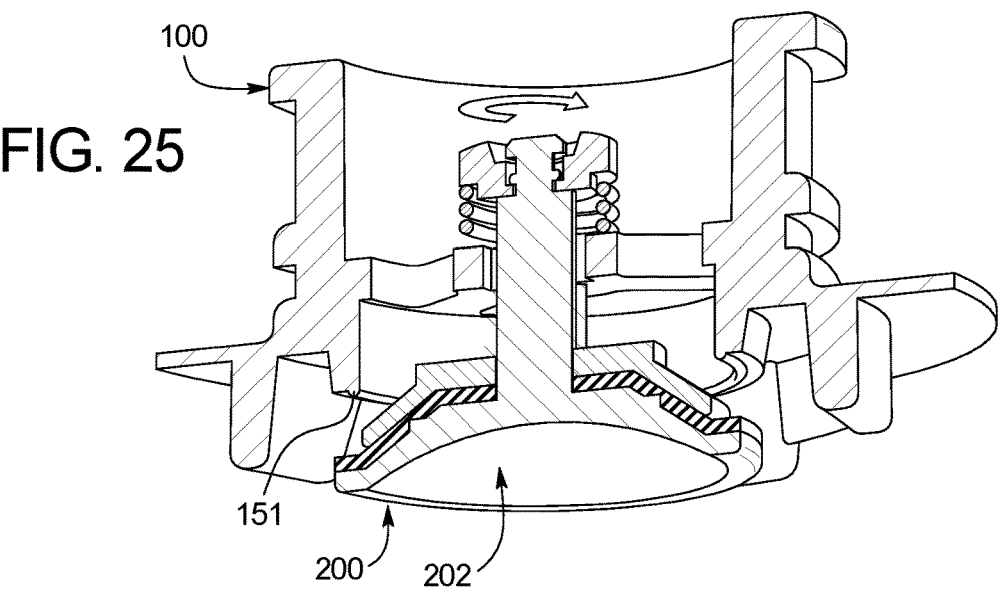
FIG. 25 is a cross-sectional perspective view of the housing of the valve of FIG. 1 with the sealing assembly mounted thereto and the stem assembly locked in the open configuration.
Figure 26:
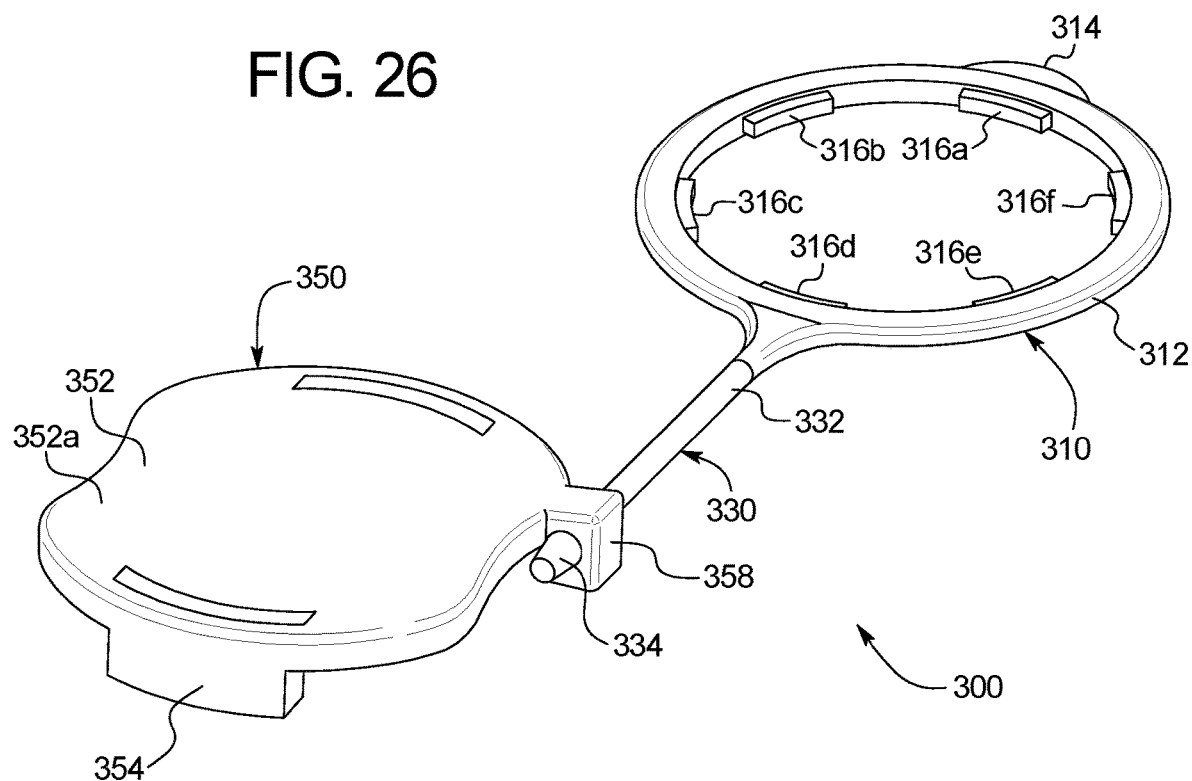
FIG. 26 is a top perspective view of the cap assembly of the valve of FIG. 1.
Figure 27:
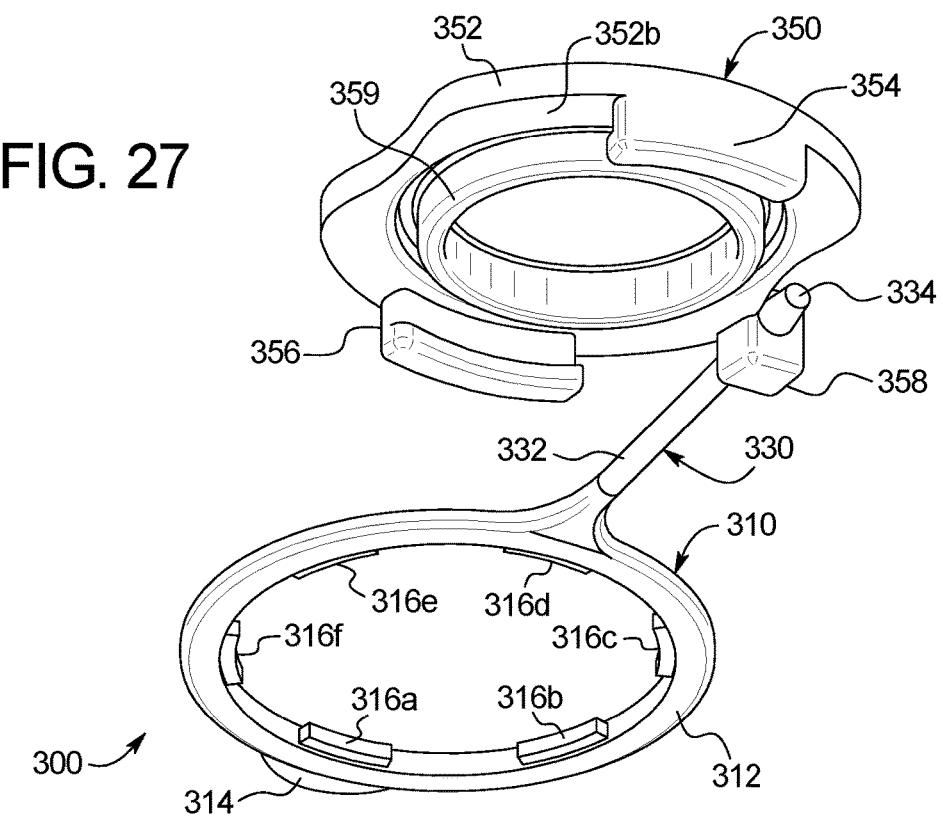
FIG. 27 is a bottom perspective view of the cap assembly of FIG. 26.
Figure 28:
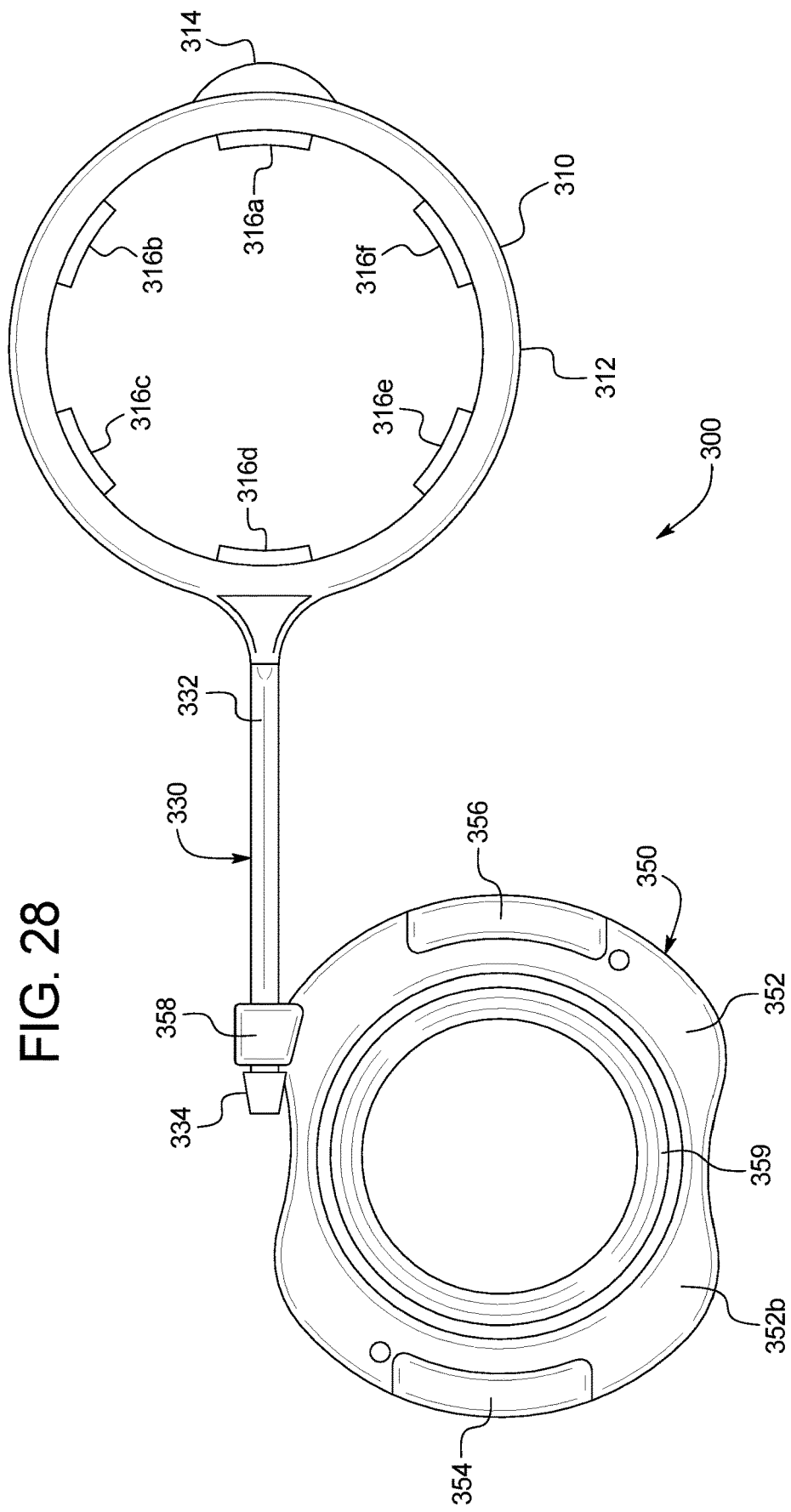
FIG. 28 is a bottom plan view of the cap assembly of FIG. 26.

To lock the stem assembly (and thus the sealing assembly 200) in the open configuration, as shown in FIG. 25, while maintaining the axial position of the stem assembly relative to the housing 100 the user rotates the stem assembly relative to the housing 100 until the locking ribs 228 and 230 are rotationally offset from the locking-rib-receiving openings 178 and 180. The user then releases the stem assembly, which enables the spring 270 to bias the stem assembly axially upward until the locking ribs 228 and 230 engage the underside of the inner ring 170 of the stem supporter 160. This stops the axial movement of the stem assembly such that the sealing element 240 remains disengaged from the sealing lip 151. This enables gas to flow through the gas passageway 190 of the housing 100 into (or out of) the dunnage bag 1000. The stem assembly can take one of multiple different open-locked positions when in the open configuration. In each open-locked position, the locking ribs 228 and 230 are rotationally offset from the locking-rib-receiving openings 178 and 180 and engage the underside of the inner ring 170. In other words, in an open-locked position, the stem assembly is rotationally positioned relative to the housing 100 such the pressure on the stem assembly is not required to maintain the gas passageway 190 open.

In this illustrated embodiment, the sealing assembly 200 is formed from five separate components. The sealing assembly can be made in other suitable manners and made from more or fewer than five components in accordance with the present disclosure.

The cap assembly 300 is best shown in FIGS. 1-3 and 26-28 and is configured to assist in attaching the valve 10 to the dunnage bag 1000 and to prevent contaminants from entering the gas passageway 190 and therefore the dunnage bag 1000. The cap assembly 300 includes an attacher 310, a flexible tether 330 connected to the attacher 310, and a cap 350 slidably connected to the tether 330.

The attacher 310 includes a ring 312; a plurality of spaced-apart attachment lips 316a, 316b, 316c, 316d, 316e, and 316f integrally connected to and extending radially inward from the ring 312; and a gripping tab 314 integrally connected and extending radially outward from the ring 312.

The tether 330 includes an elongated body 332 having a first end integrally attached to the attacher 310 and a conical head 334 at a second opposite end of the body 332. The base of the head 334 extends radially outward from the body 332.

The cap 350 includes: body 352 including a first side 352a and a second opposing side 352b, first and second attachment arms 354 and 356 integrally connected to and extending axially downward from circumferentially opposed portions of the second side of the body 352, an tether attacher 358 integrally connected and extending from the body 352 and configured to be slidably mounted to the body 332 of the tether 330, an annular sealing lip 359 integrally connected to and extending axially downward from the second side 352b of the body 352.

As best shown in FIG. 3, to mount the cap assembly 300 to the housing 100, the ring 312 is positioned to circumscribe the annular wall 112 of the housing 110 at an axial position between the first and second retaining rings 126 and 128. The diameter of the circular opening defined by the radially inward surfaces of the attachment lips 316a-316f is less than the outermost diameter defined by the respective first and second retaining rings 126 and 128. Accordingly, when in this position the first and second retaining rings 126 and 128 retain the ring 312 in place by preventing the attachment lips 316 from substantially moving in the axial direction. Additionally, when in this position, the ring 312 is adjacent the outer bag 1004 of the dunnage bag 1000 such that the dunnage bag 1000 is positioned between the ring 312 and the flange 130 of the housing 100. So when the ring 312 is mounted to the housing 100, the ring 312 helps retain the valve 10 in place on the dunnage bag 1000.

To mount the cap 350 to the housing 100, the cap 350 is positioned such that the second side 352b of the cap 350 contacts the upper end of the annular wall 112 and the sealing lip 359 partially extends into and is partially circumscribed by the annular wall 112 of the housing 112. A user then rotates the cap 350 relative to the housing 112 until the first and second attachment arms 354 and 356 engage the cap engagers 120 and 122, respectively. Once in place, the sealing lip 359 sealingly engages the inner surface 116 of the annular wall 112, thereby closing the gas passageway 190 and preventing contaminants from entering the gas passageway 190. This also prevents undesired deflation of the dunnage bag 1000, since the sealing engagement prevents gas from flowing through the gas passageway 190 and out of the dunnage bag 1000 if the stem 202 happens to move out of the closed configuration.

In this illustrated embodiment, the cap assembly 300 is formed from two individually formed components. The cap assembly can be made from other suitable materials, made in other suitable manners, and made from more or fewer than two components in accordance with the present disclosure.

In various alternative embodiments, the valve 10 does not include the cap assembly 300. In other alternative embodiments, the valve 10 includes the attacher 310 (but not the other components) of the cap assembly 300. In further alternative embodiments, the cap assembly 300 includes a suitable attachment ring other than the attacher 310.

In various embodiments, a valve for an inflatable object comprises a housing defining a gas passageway and including a sealing lip; a stem assembly mounted to the housing and movable relative to the housing between a closed configuration and an open configuration, the stem assembly comprising a stem including a shaft and a base, a retaining element mounted to the base, and a sealing element mounted to the base and positioned between the retaining element and the base; and a biasing element biasing the stem assembly to the closed configuration. When the stem assembly is in the closed configuration, the sealing element sealingly engages the sealing lip so the gas passageway is closed. When the stem assembly is in the open configuration, the sealing element is spaced-apart from the sealing lip so the gas passageway is open.

In certain such embodiments, the sealing element includes a conical surface.

In certain such embodiments, the retaining element includes a conical surface that engages the conical surface of the sealing lip.

In certain such embodiments, the base of the stem includes multiple mounting studs, and the sealing element and the retaining element are mounted to the mounting studs.

In certain such embodiments, the mounting studs each include a neck and a dome-shaped head at an end of the neck.

In certain such embodiments, an underside of each head engages the retaining element and prevents removal of the retaining element from the base of the stem.

In certain such embodiments, the stem assembly is axially movable relative to the housing between the closed configuration and the open configuration.

In certain such embodiments, when the stem assembly is in the open configuration, the stem assembly is rotatable relative to the housing to an open-locked position to lock the stem assembly in the open configuration.

In certain such embodiments, the housing includes a stem supporter that defines a shaft-receiving opening and a locking-rib-receiving opening and the stem includes a locking rib extending from the shaft. When the stem assembly is in the closed configuration, the shaft and the locking rib are respectfully received in the shaft- and locking-rib-receiving openings. When the stem assembly is in the open configuration and in the open-locked position, the shaft is received in the shaft-receiving opening and the locking rib is removed and rotationally offset from the locking-rib-receiving opening.

In certain such embodiments, the shaft further comprises a locking-element engager and the valve further comprises a locking element connected to the locking-element engager to retain the biasing element between the housing and the locking element.

In certain such embodiments, the locking element comprises a channel and the locking-element engager comprises a shoulder received in the channel to prevent rotation of the locking element relative to the stem.

In certain such embodiments, an underside of the base of the stem is concave.

In certain such embodiments, the valve further comprises a cap assembly comprising a cap mountable to the housing to close the gas passageway.

In certain such embodiments, the housing comprises an annular wall at least partially defining the gas passageway, and the cap comprises a sealing lip that sealingly engages the annular wall when the cap is mounted to the housing to close the gas passageway.

In other embodiments, an inflatable object comprises an inflatable bladder defining an interior and a valve. The valve comprises a housing including a sealing lip and defining a gas passageway in fluid communication with the interior of the bladder; a stem assembly mounted to the housing and movable relative to the housing between a closed configuration and an open configuration, the stem assembly comprising a stem including a shaft and a base, a retaining element mounted to the base, and a sealing element mounted to the base and positioned between the retaining element and the base; and a biasing element biasing the stem assembly to the closed configuration. When the stem assembly is in the closed configuration, the sealing element sealingly engages the sealing lip so the gas passageway is closed to prevent gas from flowing into or out of the interior of the inflatable bladder through the gas passageway. When the stem assembly is in the open configuration, the sealing element is spaced-apart from the sealing lip so the gas passageway is open to enable gas to flow into or out of the interior of the inflatable bladder through the gas passageway.

In certain such embodiments, the sealing element of the valve includes a conical surface, and the retaining element includes a conical surface that engages the conical surface of the sealing lip.

In certain such embodiments, the base of the stem includes multiple mounting studs, the mounting studs each include a neck and a dome-shaped head at an end of the neck, and the sealing element and the retaining element are mounted to the mounting studs such that an underside of each head engages the retaining element and prevents removal of the retaining element from the base of the stem.

In certain such embodiments, the stem assembly is axially movable relative to the housing between the closed configuration and the open configuration. When the stem assembly is in the open configuration, the stem assembly is rotatable relative to the housing to an open-locked position to lock the stem assembly in the open configuration. The housing includes a stem supporter that defines a shaft-receiving opening and a locking-rib-receiving opening, and the stem includes a locking rib extending from the shaft. When the stem assembly is in the closed configuration, the shaft and the locking rib are respectfully received in the shaft- and locking-rib-receiving openings. When the stem assembly is in the open configuration and in the open-locked position, the shaft is received in the shaft-receiving opening and the locking rib is removed and rotationally offset from the locking-rib-receiving opening.

In certain such embodiments, the shaft further comprises a locking-element engager, the valve further comprises a locking element connected to the locking-element engager to retain the biasing element between the housing and the locking element, the locking element comprises a channel, the locking-element engager comprises a shoulder received in the channel to prevent rotation of the locking element relative to the stem.

In certain such embodiments, the valve further comprises a cap assembly comprising a cap mountable to the housing to close the gas passageway, the housing comprises an annular wall at least partially defining the gas passageway, and the cap comprises a sealing lip that sealingly engages the annular wall when the cap is mounted to the housing to close the gas passageway.

The invention claimed is:

1. A valve for an inflatable object, the valve comprising:
   a housing defining a gas passageway and including a sealing lip;
   a stem assembly mounted to the housing and movable relative to the housing between a closed configuration and an open configuration, the stem assembly comprising a stem, a retaining element, and a sealing element, wherein the stem includes a shaft and a base, wherein the base includes one or more mounting studs to which the retaining element and the sealing element are mounted, wherein the sealing element is positioned between the retaining element and the base; and
   a biasing element biasing the stem assembly to the closed configuration,
   wherein when the stem assembly is in the closed configuration, the sealing element sealingly engages the sealing lip so the gas passageway is closed,
   wherein when the stem assembly is in the open configuration, the sealing element is spaced-apart from the sealing lip so the gas passageway is open.

2. The valve of claim 1, wherein the sealing element includes a conical surface.

3. The valve of claim 2, wherein the retaining element includes a conical surface that engages the conical surface of the sealing element.

4. The valve of claim 1, wherein the one or more mounting studs include multiple mounting studs.

5. The valve of claim 4, wherein the mounting studs each include a neck and a dome-shaped head at an end of the neck.

6. The valve of claim 5, wherein an underside of each head engages the retaining element and prevents removal of the retaining element from the base of the stem.

7. The valve of claim 1, wherein the stem assembly is axially movable relative to the housing between the closed configuration and the open configuration.

8. The valve of claim 7, wherein when the stem assembly is in the open configuration, the stem assembly is rotatable relative to the housing to an open-locked position to lock the stem assembly in the open configuration.

9. The valve of claim 8, wherein the housing includes a stem supporter that defines a shaft-receiving opening and a locking-rib-receiving opening;
   wherein the stem includes a locking rib extending from the shaft;
   wherein when the stem assembly is in the closed configuration, the shaft and the locking rib are respectfully received in the shaft- and locking-rib-receiving openings; and
   wherein when the stem assembly is in the open configuration and in the open-locked position, the shaft is received in the shaft-receiving opening and the locking rib is removed and rotationally offset from the locking-rib-receiving opening.

10. The valve of claim 1, wherein the shaft further comprises a locking-element engager, wherein the valve further comprises a locking element connected to the locking-element engager to retain the biasing element between the housing and the locking element.

11. The valve of claim 10, wherein the locking element comprises a channel and the locking-element engager comprises a shoulder received in the channel to prevent rotation of the locking element relative to the stem.

12. The valve of claim 1, wherein an underside of the base of the stem is concave.

13. The valve of claim 1, further comprising a cap assembly comprising a cap mountable to the housing to close the gas passageway.

14. The valve of claim 13, wherein the housing comprises an annular wall at least partially defining the gas passageway, wherein the cap comprises a sealing lip that sealingly engages the annular wall when the cap is mounted to the housing to close the gas passageway.

15. An inflatable object comprising:
an inflatable bladder defining an interior; and
a valve comprising:
 a housing including a sealing lip and defining a gas passageway in fluid communication with the interior of the bladder;
 a stem assembly mounted to the housing and movable relative to the housing between a closed configuration and an open configuration, the stem assembly comprising a stem, a retaining element, and a sealing element, wherein the stem includes a shaft and a base, wherein the base includes one or more mounting studs to which the retaining element and the sealing element are mounted, wherein the sealing element is positioned between the retaining element and the base; and
 a biasing element biasing the stem assembly to the closed configuration,
 wherein when the stem assembly is in the closed configuration, the sealing element sealingly engages the sealing lip so the gas passageway is closed to prevent gas from flowing into or out of the interior of the inflatable bladder through the gas passageway,
 wherein when the stem assembly is in the open configuration, the sealing element is spaced-apart from the sealing lip so the gas passageway is open to enable gas to flow into or out of the interior of the inflatable bladder through the gas passageway.

16. The inflatable object of claim 15, wherein the sealing element of the valve includes a conical surface, and wherein the retaining element includes a conical surface that engages the conical surface of the sealing element.

17. The inflatable object of claim 15, wherein the one or more mounting studs include multiple mounting studs, wherein the mounting studs each include a neck and a dome-shaped head at an end of the neck, wherein the sealing element and the retaining element are mounted to the mounting studs such that an underside of each head engages the retaining element and prevents removal of the retaining element from the base of the stem.

18. The inflatable object of claim 15, wherein the stem assembly is axially movable relative to the housing between the closed configuration and the open configuration;
 wherein when the stem assembly is in the open configuration, the stem assembly is rotatable relative to the housing to an open-locked position to lock the stem assembly in the open configuration;
 wherein the housing includes a stem supporter that defines a shaft-receiving opening and a locking-rib-receiving opening;
 wherein the stem includes a locking rib extending from the shaft;
 wherein when the stem assembly is in the closed configuration, the shaft and the locking rib are respectfully received in the shaft- and locking-rib-receiving openings; and
 wherein when the stem assembly is in the open configuration and in the open-locked position, the shaft is received in the shaft-receiving opening and the locking rib is removed and rotationally offset from the locking-rib-receiving opening.

19. The inflatable object of claim 15, wherein the shaft further comprises a locking-element engager, wherein the valve further comprises a locking element connected to the locking-element engager to retain the biasing element between the housing and the locking element, wherein the locking element comprises a channel, and wherein the locking-element engager comprises a shoulder received in the channel to prevent rotation of the locking element relative to the stem.

20. The inflatable object of claim 15, wherein the valve further comprises a cap assembly comprising a cap mountable to the housing to close the gas passageway, wherein the housing comprises an annular wall at least partially defining the gas passageway, wherein the cap comprises a sealing lip that sealingly engages the annular wall when the cap is mounted to the housing to close the gas passageway.

* * * * *